United States Patent
Kim et al.

(10) Patent No.: US 12,549,243 B2
(45) Date of Patent: Feb. 10, 2026

(54) METHOD AND DEVICE FOR TRANSMITTING AND RECEIVING SIGNAL IN WIRELESS COMMUNICATION SYSTEM

(71) Applicant: LG ELECTRONICS INC., Seoul (KR)

(72) Inventors: Kyuseok Kim, Seoul (KR); Jiwon Kang, Seoul (KR); Hyungtae Kim, Seoul (KR); Seongwon Go, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 452 days.

(21) Appl. No.: 18/011,731

(22) PCT Filed: Jun. 22, 2021

(86) PCT No.: PCT/KR2021/007799
§ 371 (c)(1),
(2) Date: Dec. 20, 2022

(87) PCT Pub. No.: WO2021/261877
PCT Pub. Date: Dec. 30, 2021

(65) Prior Publication Data
US 2023/0318687 A1    Oct. 5, 2023

(30) Foreign Application Priority Data

Jun. 23, 2020 (KR) .......... 10-2020-0076801
Jun. 30, 2020 (KR) .......... 10-2020-0080601
Aug. 6, 2020 (KR) .......... 10-2020-0098866

(51) Int. Cl.
H04B 7/06    (2006.01)
H04L 5/00    (2006.01)
H04W 36/00   (2009.01)

(52) U.S. Cl.
CPC ....... *H04B 7/06968* (2023.05); *H04B 7/0626* (2013.01); *H04L 5/0051* (2013.01); *H04W 36/0072* (2013.01)

(58) Field of Classification Search
None
See application file for complete search history.

(56) References Cited

U.S. PATENT DOCUMENTS

2017/0078903 A1* 3/2017 Kusashima .......... H04L 5/0057
2018/0070337 A1  3/2018 Park et al.
(Continued)

OTHER PUBLICATIONS

Ericsson, Lower-layer mobility enhancements, R1-1911226, 3GPP TSG-RAN WG1 #98bis, Chongqing, China, Oct. 4, 2019, see pp. 1-10.
(Continued)

*Primary Examiner* — Minh Trang T Nguyen
(74) *Attorney, Agent, or Firm* — BRYAN CAVE LEIGHTON PAISNER LLP

(57) ABSTRACT

A method and an apparatus for transmitting/receiving a signal in a wireless communication system are disclosed. A method for receiving a downlink signal according to one embodiment of the present disclosure, may comprise steps of: receiving transmission configuration indicator (TCI) state information of a downlink signal from a base station, the TCI state information including quasi co-location (QCL) information for configuring QCL relation between the downlink signal and a reference signal; and receiving the downlink signal based on the TCI state information from the base station. The reference signal for the downlink signal may be configured based on a non-serving cell other than a serving cell of the terminal, a signal of a non-serving cell, measurement object information for radio resource management (RRM) measurement configured by the QCL information.

18 Claims, 20 Drawing Sheets

(56) References Cited

U.S. PATENT DOCUMENTS

| | | | |
|---|---|---|---|
| 2019/0281487 A1* | 9/2019 | Liu | H04L 5/0057 |
| 2019/0281587 A1 | 9/2019 | Zhang et al. | |
| 2020/0092141 A1* | 3/2020 | Chen | H04L 25/0204 |
| 2022/0110181 A1* | 4/2022 | Miao | H04L 5/0048 |
| 2022/0346039 A1* | 10/2022 | Bontu | H04W 52/42 |

OTHER PUBLICATIONS

Qualcomm Incorporated, Introduction of NR operation with Shared Spectrum Access in RRC, R2-2001981, 3GPP TSG-RAN WG2 #109e, Mar. 12, 2020, see pp. 1-109.

3GPP TSGRAN; NR; Physical layer procedures for data (Release 16), 3GPP TS 38.214 V16.1.0, Apr. 3, 2020, see pp. 1-148.

\* cited by examiner

METHOD AND DEVICE FOR TRANSMITTING AND RECEIVING SIGNAL IN WIRELESS COMMUNICATION SYSTEM

This application is the National Stage filing under 35 U.S.C. 371 of International Application No. PCT/KR2021/007799 filed on Jun. 22, 2021, which claims priority to Korean Patent Application Nos. 10-2020-0076801 filed on Jun. 23, 2020; 10-2020-0080601 filed on Jun. 30, 2020 and 10-2020-0098866 filed on Aug. 6, 2020, the contents of which are all hereby incorporated by reference herein in their entirety.

TECHNICAL FIELD

The present disclosure relates to a wireless communication system, and in more detail, relates to a method and an apparatus of transmitting and receiving an uplink signal and/or a downlink signal in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus for transmitting and receiving an uplink signal and/or a downlink signal.

In addition, an additional technical object of the present disclosure is to provide a method and an apparatus for transmitting and receiving an uplink signal and/or a downlink signal by applying a quasi co-location (QCL) relation with a non-serving cell signal to an uplink signal and/or a downlink signal.

In addition, an additional technical object of the present disclosure is to provide a method and an apparatus for transmitting and receiving an uplink signal and/or a downlink signal by using a signal for a non-serving cell as a resource for measuring/acquiring/reporting channel state information.

The technical objects to be achieved by the present disclosure are not limited to the above-described technical objects, and other technical objects which are not described herein will be clearly understood by those skilled in the pertinent art from the following description.

A method for receiving a downlink signal in a wireless communication system may comprise: receiving transmission configuration indicator (TCI) state information of a downlink signal from a base station, the TCI state information including quasi co-location (QCL) information for configuring QCL relation between the downlink signal and a reference signal; and receiving the downlink signal based on the TCI state information from the base station. The reference signal for the downlink signal may be configured based on a non-serving cell other than a serving cell of the terminal, a signal of a non-serving cell, measurement object information for radio resource management (RRM) measurement configured by the QCL information.

A method for transmitting a downlink signal in a wireless communication system according to a additional aspect of the present disclosure may comprise: transmitting configuration information for transmission configuration indicator (TCI) state of a downlink signal to a terminal, the TCI state information including quasi co-location (QCL) information for configuring QCL relation between the downlink signal and a reference signal; and transmitting the downlink signal based on the TCI state information to the terminal. The reference signal for the downlink signal may be configured based on a non-serving cell other than a serving cell of the terminal, a signal of a non-serving cell, measurement object information for radio resource management (RRM) measurement configured by the QCL information.

According to an embodiment of the present disclosure, since resources of a non-serving cell (i.e., a neighboring cell) may be considered in a process of measuring/obtaining/reporting channel state information, a resource more suitable for transmitting and receiving an uplink and/or a downlink signal may be selected.

In addition, according to an embodiment of the present disclosure, by considering the resources of a non-serving cell (i.e, a neighbor cell) in a lower layer (i.e., the first layer (L1)/the second layer (L2)), since the higher layer (i.e., the third layer (L3)) measurement and handover procedure may be omitted, the resources of the non-serving cell (ie, the neighboring cell) may be efficiently used, and the time for this may be shortened.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
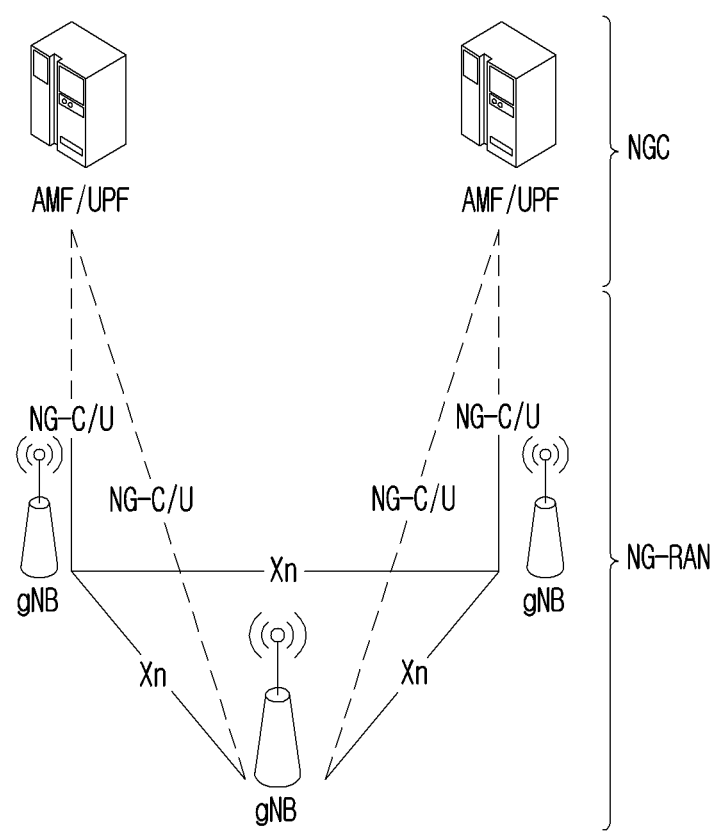
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
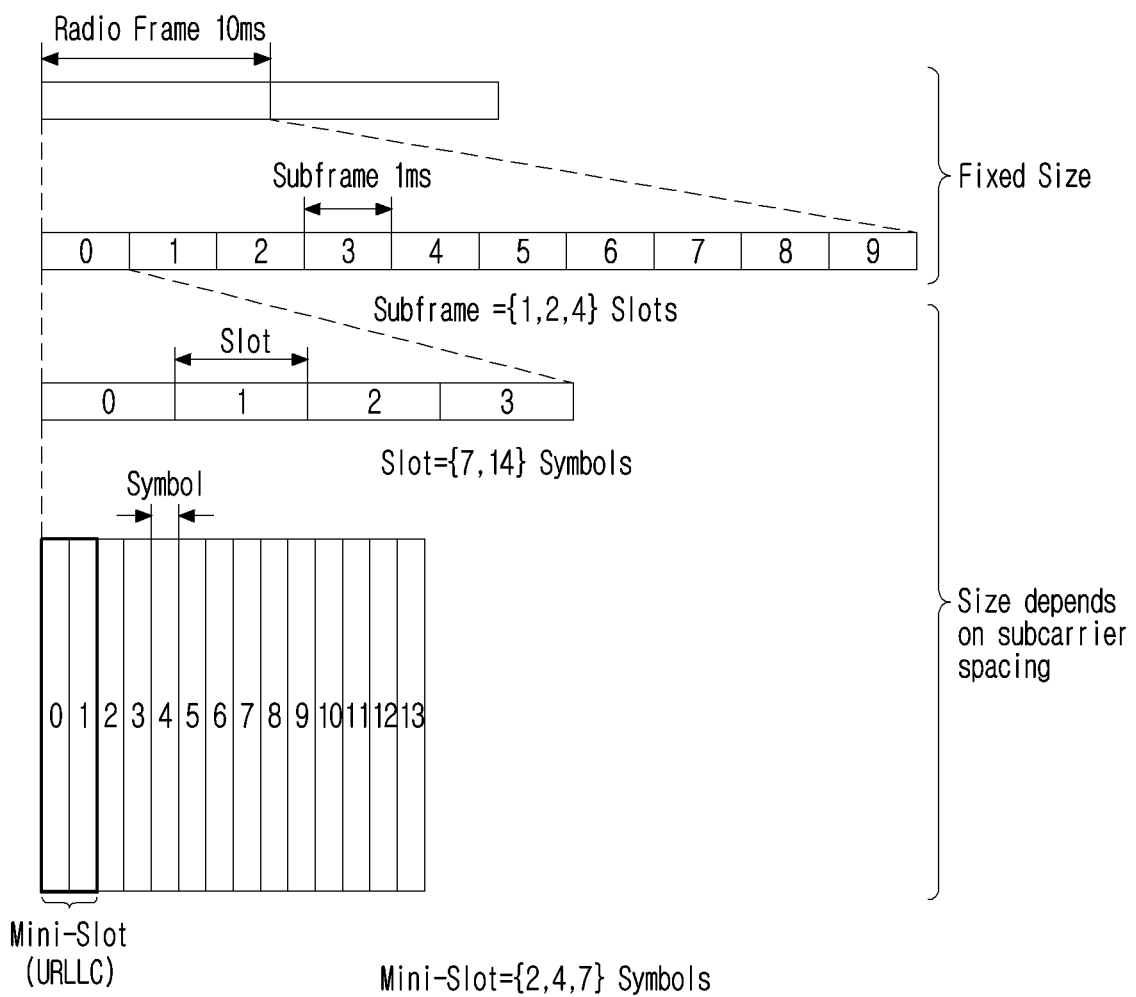
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [KHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 KHz |
| FR2 | 24250 MHz-52600 MHz | 60, 120, 240 KHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration p, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 1 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
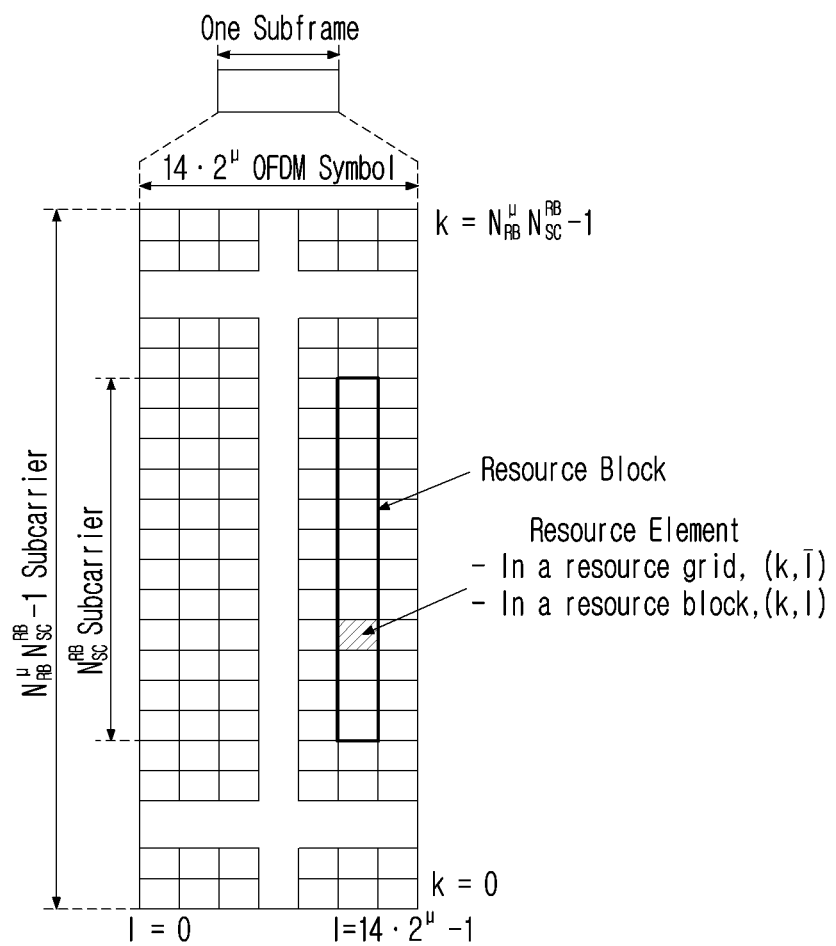
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per p and antenna port p. Each element of a resource grid for p and an antenna port p is referred to as a resource element and is uniquely identified by an index pair (k,l'). Here, k=0, . . . , $N_{RB}^{\mu}N_{sc}^{RB}-1$ is an index in a frequency domain and l'=0, . . . , $2^{\mu}N_{symb}^{(\mu)}-1$ refers to a position of a symbol in a subframe. When referring to a resource element in a slot, an index pair (k,l) is used. Here, l=0, . . . , $N_{symb}^{\mu}-1$. A resource element (k,l') for $\mu$ and an antenna port p corresponds to a complex value, $a_{k,l'}^{(p,\mu)}$. When there is no risk of confusion or when a specific antenna port or numerology is not specified, indexes p and $\mu$ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration $\mu$. The center of subcarrier 0 of common resource block 0 for a subcarrier spacing configuration p is identical to 'point A'. A relationship between a common resource block number $n_{CRB}^{\mu}$ and a resource element (k,l) for a subcarrier spacing configuration $\mu$ in a frequency domain is given as in the following Equation 1.

$$n_{CRB}^{\mu} = \left\lfloor \frac{k}{N_{sc}^{RB}} \right\rfloor \quad [\text{Equation 1}]$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad [\text{Equation 2}]$$

$N_{BWP,i}^{start,\mu}$ is a common resource block that a BWP starts relatively to common resource block 0.

Figure 4:
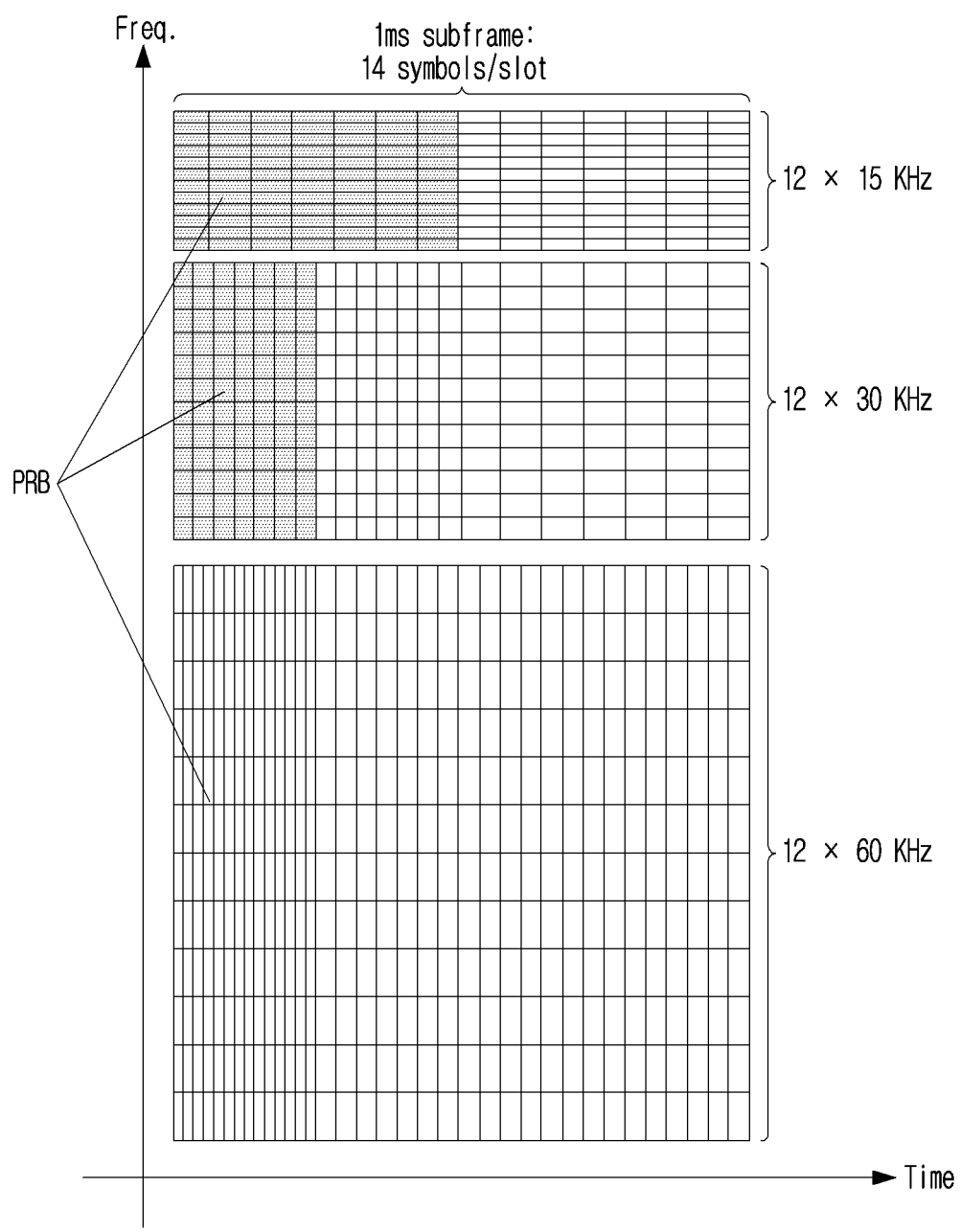
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
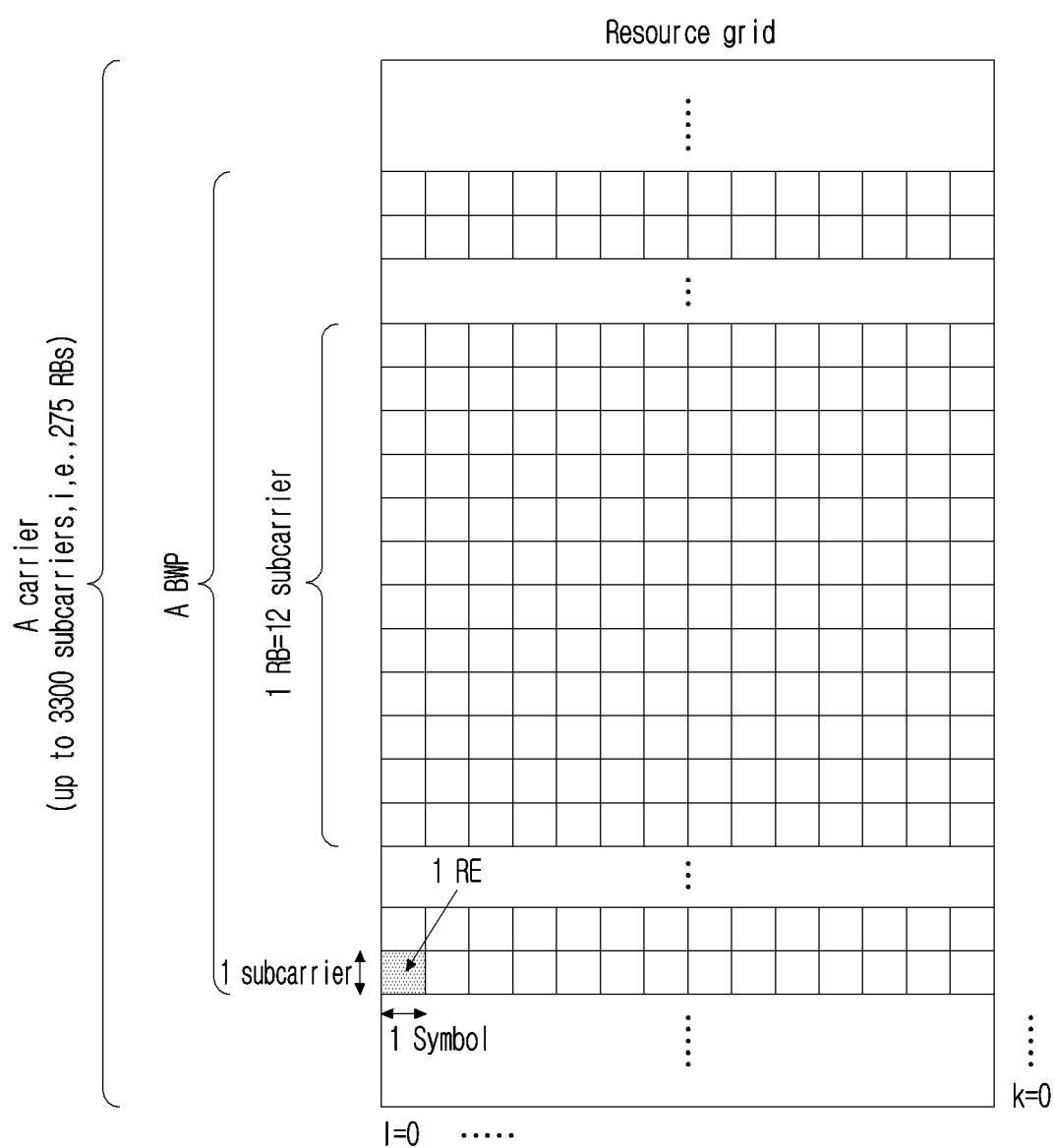
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
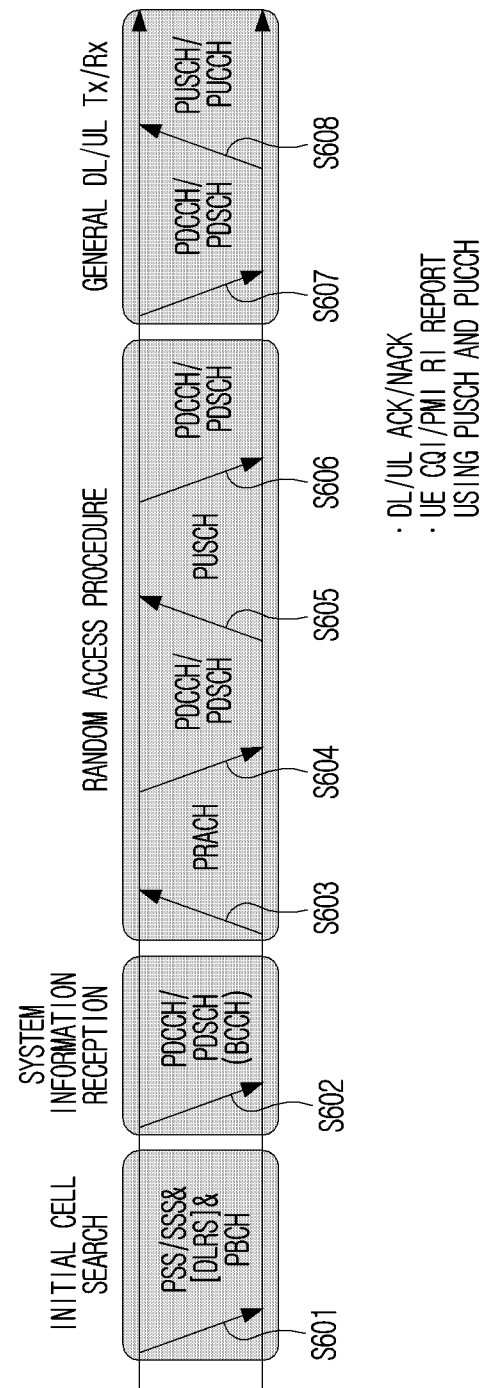
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH)

from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.
- 'QCL-TypeA': {Doppler shift, Doppler spread, average delay, delay spread}
- 'QCL-TypeB': {Doppler shift, Doppler spread}
- 'QCL-TypeC': {Doppler shift, average delay}
- 'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Method for Transmitting and Receiving Downlink/Uplink Signals

In the current standard, based on resources (e.g., SSB (synchronization signal block)/NZP (Non-zero power) CSI-RS/ZP (Zero power) CSI-RS, etc.), the terminal may perform processes such as CSI measurement/acquisition/reporting. In addition, in order that the terminal receives Quasi co-location (QCL) information or/and physical channels (e.g., PDSCH/PDCCH/PBCH, etc.) corresponding to resources used for CSI measurement/acquisition/reporting, QCL information corresponding to each channel/DMRS of each channel may also be defined based on the resource within the serving cell.

As described above, the current standard has a limitation that a resource for CSI measurement/acquisition/report and a resource that may be utilized as a reference RS (reference signal) in QCL information are resources within a serving cell. If the 'resources within the serving cell' may be extended to the resources of neighboring cells, many advantages may be obtained. For example, the resource of the neighboring cell may be considered in the CSI measurement/acquisition/reporting process in the first layer (L1: layer 1)/second layer (L2: layer 2) step, so the terminal may look for more candidate resources (measurement), and based on this, the terminal may report resources more suitable for control data (control information) transmission/data transmission to the base station. In addition, since the above operation may be performed in the L1/L2 step, the existing layer 3 (L3) measurement (e.g., radio resource management (RRM) measurement, etc.) and handover procedure will not be performed. Therefore, the time required for the terminal to use the resources of the neighboring cell may be greatly reduced, and the terminal may use the resources of the neighboring cell more dynamically.

Hereinafter, the present disclosure proposes a method for extending a resource that may be utilized as a reference RS in resource and QCL information for CSI measurement/acquisition/report to a resource in a neighboring cell.

Although the above description has been described based on DL resources/physical channels for convenience, this is not intended to limit the applicable range of the proposed technology, so it may be considered that the proposed methods are also applied to UL resources/physical channels self-explanatory First, a method of configuring a reference RS in QCL information according to the current standard will be described.

Table 6 illustrates TCI-State information elements (IEs) for configuring QCL information for downlink resources/physical channels.

The TCI-State IE associates one or two DL reference signals (RS) with corresponding quasi co-location (QCL) types.

TABLE 6

-- ASN1START
-- TAG-TCI-STATE-START
TCI-State ::=            SEQUENCE {
  tci-StateId              TCI-StateId,
  qcl-Type1                QCL-Info,
  qcl-Type2                QCL-Info
                           OPTIONAL,  -- Need R
...
}
QCL-Info ::=             SEQUENCE {
  cell                     ServCellIndex
                           OPTIONAL,  -- Need R
  bwp-Id                   BWP-Id
                           OPTIONAL,  -- Cond CSI-RS-Indicated
  referenceSignal          CHOICE {
    csi-rs                   NZP-CSI-RS-ResourceId,
    ssb                      SSB-Index
  },
  qcl-Type                 ENUMERATED {typeA, typeB, typeC, typeD},
...
}
-- TAG-TCI-STATE-STOP
-- ASN1STOP In Table 6, the bwp-Id parameter indicates the DL BWP (bandwidth part) where the RS is located, the cell parameter indicates the carrier where the RS is located, and the reference signal parameter indicates a reference antenna port(s) that becomes a source of quasi co-location for target antenna port(s) or a reference signal including the reference antenna port(s) for the corresponding target antenna port(s). The target antenna port(s) may be CSI-RS, PDCCH DMRS, or PDSCH DMRS. For example, in order to indicate QCL reference RS information for a non-zero power (NZP) CSI-RS, a corresponding TCI state ID (identifier) may be indicated in NZP CSI-RS resource configuration information. As another example, the TCI state ID may be indicated in each CORESET configuration to indicate QCL reference information for PDCCH DMRS antenna port(s). As another example, TCI state ID may be indicated through DCI to indicate QCL reference information for PDSCH DMRS antenna port(s). As shown in Table 6 above, only resources within a specific serving cell expressed as a cell parameter (i.e., ServCellIndex value) may be configured as a reference RS in QCL-Info.

Hereinafter, in the proposal of the present disclosure to be described later, a method capable of including a reference RS of QCL information to a resource in a neighboring cell is proposed.

First, a method for configuring resources for CSI measurement/acquisition/reporting according to the current standard will be described.

Table 7 illustrates a CSI-ResourceConfig IE for configuring resources for CSI measurement/acquisition/reporting.

TABLE 7

```
-- ASN1START
-- TAG-CSI-RESOURCECONFIG-START
CSI-ResourceConfig ::=          SEQUENCE {
    csi-ResourceConfigId            CSI-ResourceConfigId,
    csi-RS-ResourceSetList          CHOICE {
      nzp-CSI-RS-SSB                  SEQUENCE {
        nzp-CSI-RS-ResourceSetList          SEQUENCE (SIZE (1..maxNrofNZP-CSI-
RS-ResourceSetsPerConfig)) OF NZP-CSI-RS-ResourceSetId
OPTIONAL,  -- Need R
        csi-SSB-ResourceSetList             SEQUENCE (SIZE (1..maxNrofCSI-SSB-
ResourceSetsPerConfig)) OF CSI-SSB-ResourceSetId
OPTIONAL   -- Need R
      },
    csi-IM-ResourceSetList              SEQUENCE (SIZE (1..maxNrofCSI-IM-
ResourceSetsPerConfig)) OF CSI-IM-ResourceSetId
    },
    bwp-Id                          BWP-Id,
    resourceType                    ENUMERATED { aperiodic, semiPersistent,
periodic },
    ...
}
-- TAG-CSI-RESOURCECONFIG-STOP
-- ASN1STOP
```

As shown in Table 7, a resource for measuring/obtaining/reporting CSI may be configured for a specific BWP within a specific serving cell. For this, it is possible to use a SSB of the serving cell or/and to define the NZP CSI-RS resource/CSI-IM resource for a specific BWP of a specific serving cell. Hereinafter, in the proposal of the present disclosure to be described later, a method for utilizing SSB of a neighboring cell or/and CSI-RS for L3 measurement as a resource for CSI measurement/acquisition/reporting is proposed.

Hereinafter, what is described as a transmission and reception point (TRP) in the present disclosure is for convenience of explanation, and the TRP may be interpreted as being replaced with terms such as a panel/beam.

In addition, in the present disclosure, L1 (layer 1) signaling may mean DCI-based dynamic signaling between a base station and a terminal, and L2 (layer 2) signaling may mean RRC/MAC control element (CE) based higher layer signaling between a base station and a terminal.

First, a method for configuring a reference RS based on a resource of a non-serving cell in QCL information (i.e., QCL-Info in TCI-State IE) will be described.

Proposal #1: A Method for Configuring a Reference RS Based on Non-Serving Cell Resources in QCL Information According to proposal #1, in QCL information in a serving cell (i.e., QCL-Info in a TCI-State IE), a reference RS may be configured as a resource of a non-serving cell. For this, the following non-serving cell resource information (e.g., SSB information/CSI-RS information for mobility, etc.) may be configured/used.

Hereinafter, in the present disclosure, a mobility CSI-RS refers to a CSI-RS configured for radio resource management (RRM) measurement.

That is, the base station may configure a signal of the non-serving cell (e.g., SSB, CSI-RS for mobility, etc.) as a reference RS in QCL information for a downlink channel (e.g., PDSCH, PDCCH, etc.) or a downlink reference signal (e.g., CSI-RS, etc.) or an uplink channel (e.g., PUCCH, PUSCH, etc.) or an uplink reference signal (e.g., SRS, etc.) of a serving cell.

Embodiment #A1: Method for Configuring/Using SSB Information of Non-Serving Cell Embodiment #A1-1: In order to configure SSB information of a non-serving cell, the base station may configure measurement object (MO) information (e.g., MO ID)/physical cell ID (PCI)/SSB index, etc to the terminal. Here, the PCI may be one of PCIs included in the MO ID. Also, the SSB index may indicate one of SSBs corresponding to the PCI included in the MO ID.

More specifically, the base station may use dedicated signaling to configure a terminal in an RRC connected mode to perform and report measurements. Here, the measurement may be intra-frequency, inter-frequency, or inter-system. Here, intra-frequency and inter-frequency measurements may be based on SS/PBCH blocks or CSI-RS resources.

The measurement configuration includes a measurement identity, a measurement object, a reporting configuration, a quantity configuration, and a measurement gap configuration.

Here, the measurement identifier identifies a link between a reporting configuration and a measurement object. The measurement identifier is used for reference when the terminal provides measurement results in a measurement report message.

A measurement object identifies SS/PBCH blocks and CSI-RS resources to be measured within intra-frequency and inter-frequency measurement. In addition, the measurement object specifies a corresponding subcarrier spacing. Cells in the black list within the measurement target may be excluded from event evaluation and measurement reporting. In addition, cells in the white list of measurement objects do not necessarily mean that they are used for measurement, and cells in the white list to be used for event evaluation and measurement reporting are specified by the report configuration.

Table 8 illustrates a higher layer IE (i.e., MeasObjectNR IE) for a measurement object (MO) that may be configured for RRM measurement in the terminal.

The IE for the measurement object (i.e., the MeasObjectNR IE) specifies information applicable for SS/PBCH block(s) intra/inter-frequency measurement and/or CSI-RS intra/inter-frequency measurement.

TABLE 8

```
-- ASN1START
-- TAG-MEASOBJECTNR-START
MeasObjectNR ::=                    SEQUENCE {
    ssbFrequency                                    ARFCN-ValueNR
OPTIONAL,    -- Cond SSBorAssociatedSSB
    ssbSubcarrierSpacing                            SubcarrierSpacing
OPTIONAL,    -- Cond SSBorAssociatedSSB
    smtc1                                           SSB-MTC
OPTIONAL,    -- Cond SSBorAssociatedSSB
    smtc2                                           SSB-MTC2
OPTIONAL,    -- Cond IntraFreqConnected
    refFreqCSI-RS                                   ARFCN-ValueNR
OPTIONAL,    -- Cond CSI-RS
    referenceSignalConfig           ReferenceSignalConfig,
    absThreshSS-BlocksConsolidation                 ThresholdNR
OPTIONAL,    -- Need R
    absThreshCSI-RS-Consolidation                   ThresholdNR
OPTIONAL,    -- Need R
    nrofSS-BlocksToAverage                  INTEGER (2..maxNrofSS-
BlocksToAverage)                    OPTIONAL, -- Need R
    nrofCSI-RS-ResourcesToAverage           INTEGER (2..maxNrofCSI-RS-
ResourcesToAverage)                 OPTIONAL,  -- Need R
    quantityConfigIndex             INTEGER (1..maxNrofQuantityConfig),
    offsetMO                        Q-OffsetRangeList,
    cellsToRemoveList                               PCI-List
OPTIONAL,    -- Need N
    cellsToAddModList                               CellsToAddModList
OPTIONAL,    -- Need N
    blackCellsToRemoveList                          PCI-RangeIndexList
OPTIONAL,    -- Need N
    blackCellsToAddModList                  SEQUENCE (SIZE (1..maxNrofPCI-
Ranges)) OF PCI-RangeElement        OPTIONAL,  -- Need N
    whiteCellsToRemoveList                          PCI-RangeIndexList
OPTIONAL,    -- Need N
    whiteCellsToAddModList                  SEQUENCE (SIZE (1..maxNrofPCI-
Ranges)) OF PCI-RangeElement        OPTIONAL,  -- Need N
    ...,
    [[
    freqBandIndicatorNR                             FreqBandIndicatorNR
OPTIONAL,    -- Need R
    measCycleSCell                          ENUMERATED {sf160, sf256, sf320,
sf512, sf640, sf1024, sf1280}       OPTIONAL   -- Need R
    ]],
    [[
    smtc3list-r16                                   SSB-MTC3List-r16
OPTIONAL,    -- Cond FFS
    rmtc-Config-r16                                 SetupRelease {RMTC-Config-r16}
OPTIONAL,    -- Need M
    ssb-PositionQCL-Common-r16              SSB-PositionQCL-Relationship-r16
OPTIONAL,    -- Need M
    ssb-PositionQCL-CellsToAddModList-r16           SSB-PositionQCL-
CellsToAddModList-r16               OPTIONAL,   -- Need N
    ssb-PositionQCL-CellsToRemoveList-r16           PCI-List
OPTIONAL,    -- Need N
    t312-r16                                SetupRelease { T312-r16 }
OPTIONAL    -- Need M
    ]]
}
SSB-MTC3List-r16::=     SEQUENCE (SIZE (1..4)) OF SSB-MTC3-r16
T312-r16 ::=                    ENUMERATED { ms0, ms50, ms100, ms200,
ms300, ms400, ms500, ms1000}
ReferenceSignalConfig::=        SEQUENCE {
    ssb-ConfigMobility                              SSB-ConfigMobility
OPTIONAL,    -- Need M
    csi-rs-ResourceConfigMobility                   SetupRelease { CSI-RS-
ResourceConfigMobility }            OPTIONAL   -- Need M
}
SSB-ConfigMobility::=           SEQUENCE {
    ssb-ToMeasure                           SetupRelease { SSB-ToMeasure }
OPTIONAL,    -- Need M
    deriveSSB-IndexFromCell         BOOLEAN,
    ss-RSSI-Measurement                             SS-RSSI-Measurement
OPTIONAL,    -- Need M
    ...
}
Q-OffsetRangeList ::=           SEQUENCE {
    rsrpOffsetSSB                   Q-OffsetRange           DEFAULT dB0,
    rsrqOffsetSSB                   Q-OffsetRange           DEFAULT dB0,
    sinrOffsetSSB                   Q-OffsetRange           DEFAULT dB0,
    rsrpOffsetCSI-RS                Q-OffsetRange           DEFAULT dB0,
```

TABLE 8-continued

| | | |
|---|---|---|
| rsrqOffsetCSI-RS | Q-OffsetRange | DEFAULT dB0, |
| sinrOffsetCSI-RS | Q-OffsetRange | DEFAULT dB0 |
| } | | |
| ThresholdNR ::= | SEQUENCE { | |
| thresholdRSRP | | RSRP-Range |
| OPTIONAL, -- Need R | | |
| thresholdRSRQ | | RSRQ-Range |
| OPTIONAL, -- Need R | | |
| thresholdSINR | | SINR-Range |
| OPTIONAL -- Need R | | |
| } | | |
| CellsToAddModList ::= | SEQUENCE (SIZE (1..maxNrofCellMeas)) OF | |
| CellsToAddMod | | |
| CellsToAddMod ::= | SEQUENCE { | |
| physCellId | PhysCellId, | |
| cellIndividualOffset | Q-OffsetRangeList | |
| } | | |
| RMTC-Config-r16 ::= | SEQUENCE { | |
| rmtc-Periodicity-r16 | ENUMERATED {ms40, ms80, ms160, ms320, | |
| ms640}, | | |
| rmtc-SubframeOffset-r16 | | INTEGER (0..639) |
| OPTIONAL, -- Need M | | |
| measDuration-r16 | ENUMERATED { sym1, sym14, sym28, sym42, | |
| sym70}, | | |
| rmtc-MeasARFCN-r16 | ARFCN-ValueNR, | |
| ... | | |
| } | | |
| SSB-PositionQCL-CellsToAddModList-r16 ::= SEQUENCE (SIZE | | |
| (1..maxNrofCellMeas)) OF SSB-PositionQCL-CellsToAdd-r16 | | |
| SSB-PositionQCL-CellsToAdd-r16 ::= SEQUENCE { | | |
| physCellId-r16 | PhysCellId, | |
| ssb-PositionQCL-r16 | SSB-PositionQCL-Relationship-r16 | |
| } | | |
| -- TAG-MEASOBJECTNR-STOP | | |
| -- ASN1STOP | | |

Referring to Table 8, within a specific MO (i.e., MeasObjectNR IE), information for a time/frequency resource domain for an SSB that may be included in the MO (i.e., time resource information (smtc1/smtc2) for the time domain, frequency resource information (ssbFrequency/ssb-SubcarrierSpacing) on the frequency domain) and PCI list (including white cell list/black cell list) is included.

Here, a field (parameter) for the first measurement timing configuration (i.e., smtc1) indicates a primary measurement timing configuration. A field (parameter) for the first measurement timing configuration (i.e., smtc2) indicates a secondary measurement timing configuration for a synchronization signal (SS) corresponding to this MO. The field (parameter) for the SSB frequency (i.e., ssbFrequency) indicates the frequency of the SS associated with this MO. The field (parameter) for the SSB subcarrier spacing (i.e., ssbSubcarrierSpacing) indicates the subcarrier spacing of the SSB (e.g., 15 khz or 30 khz in FR1 or 120 khz or 240 khz in FR1/FR2). A field (parameter) for cells added to the black list (i.e., blackCellsToAddModList) indicates a list of cells added/modified in the black list of cells, and a field (parameter) for cells removed from the black list (i.e., blackCellsToRemoveList) indicates a list of cells to be removed from the black list of cells. A field (parameter) for cells added to the white list (i.e., whiteCellsToAddModList) indicates a list of cells to be added/modified in the white list of cells. A field (parameter) for cells to be removed from the white list (i.e., whiteCellsToRemoveList) indicates a list of cells to be removed from the white list of cells.

Accordingly, the base station may configure SSB information (e.g., time/frequency resource region of SSB, corresponding PCI, etc.) of a non-serving cell based on specific MO information. Table 9 below shows the configuration of IE that maps a specific ID to a specific MO. Based on the IE below, a specific MO may be mapped to a specific ID.

Table 9 illustrates a higher layer IE (i.e., MeasObjectToAddModList IE) for the measurement object list.

The IE for the measurement object list (i.e., MeasObjectToAddModList IE) is related to a list of measurement objects to be added or modified.

TABLE 9

| | |
|---|---|
| MeasObjectToAddModList ::= | SEQUENCE (SIZE |
| (1..maxNrofObjectId) ) OF MeasObjectToAddMod | |
| MeasObjectToAddMod ::= | SEQUENCE { |
| measObjectId | MeasObjectId, |
| measObject | CHOICE { |
| measObjectNR | MeasObjectNR, |
| ..., | |
| measObjectEUTRA | MeasObjectEUTRA, |
| measObjectUTRA-FDD-r16 | MeasObjectUTRA-FDD-r16, |
| measObjectNR-SL-r16 | MeasObjectNR-SL-r16, |
| measObjectEUTRA-SL-r16 | MeasObjectEUTRA-SL-r16, |
| measObjectCLI-r16 | MeasObjectCLI-r16 |
| } | |
| } | |
| } | |
| -- TAG-MEASOBJECTTOADDMODLIST-STOP | |
| -- ASN1STOP | |

Advantages of the above proposed method are as follows. O configured for RRM measurement by the terminal may already include SSB information of the non-serving cell. And, if SSB information is included in the MO, the terminal may already be performing measurements on the SSB of the non-serving cell. Therefore, when using the MO information in the QCL information of the serving cell, there is an advantage in that the SSB resources already transmitted by base stations of different PCIs and the measurement process/result values already performed by the terminal for RRM measurement may be utilized. That is, in order to configure the reference RS as a resource of a non-serving cell in the QCL information within the serving cell, the non-serving cell may not transmit a separate resource for this, so the resource of the neighboring cell may be saved, and even if there is no separate report value, it is possible to have the advantage of utilizing by the base station, the resources of a suitable neighbor cell based on the report value of the terminal for RRM measurement. In addition, since the terminal may use the measurement result already possessed without going through a separate measurement process, it may have the advantage of reducing the complexity of the terminal and increasing the battery life. The above proposed method is summarized as follows. The base station may configure/indicate the terminal of MO information (e.g., MO ID)/PCI/SSB index in order to configure the reference RS to the SSB of the non-serving cell in the QCL information within the serving cell. Here, the SSB corresponding to the SSB index may correspond to the PCI, and the PCI may be one of PCI values included in a specific MO corresponding to the MO ID. The terminal may assume that the SSB corresponding to the SSB index is transmitted based on the time/frequency resource domain defined in the MO corresponding to the MO ID. In addition, the PCI may be defined to be one of PCI values included in a white cell list configured in the MO.

Embodiment #A1-2: In order to configure SSB information of a non-serving cell in QCL information, the base station may configure/indicate serving cell information (e.g., serving cell index)/Physical Cell ID (PCI)/SSB index, etc to the terminal.

Table 10 illustrates an IE for configuring a serving cell (i.e., ServingCellConfig IE) that may be configured for configuring a serving cell in a terminal.

An IE for configuring a serving cell (i.e., ServingCellConfig IE) is used to configure (add or modify) a serving cell to a terminal. Here, the serving cell may be a special cell (SpCell) or a secondary cell (SCell) of a master cell group (MCG) or a secondary cell group (SCG). SpCell is the primary serving cell of MCG or SCG. Most of the parameters are UE-specific, but partially cell-specific (e.g., an additionally configured bandwidth portion). Reconfiguration between PUCCH SCell and SCell without PUCCH is supported only when SCell is released and added.

TABLE 10

```
-- ASN1START
-- TAG-SERVINGCELLCONFIG-START
ServingCellConfig ::=                        SEQUENCE {
    tdd-UL-DL-ConfigurationDedicated         TDD-UL-DL-ConfigDedicated
OPTIONAL,  -- Cond TDD
    initialDownlinkBWP                       BWP-DownlinkDedicated
OPTIONAL,  -- Need M
    downlinkBWP-ToReleaseList                SEQUENCE (SIZE (1..maxNrofBWPs)) OF
BWP-Id  OPTIONAL,  -- Need N
    downlinkBWP-ToAddModList                 SEQUENCE (SIZE (1..maxNrofBWPs)) OF
BWP-Downlink  OPTIONAL,  -- Need N
    firstActiveDownlinkBWP-Id                BWP-Id
OPTIONAL,  -- Cond SyncAndCellAdd
    bwp-InactivityTimer                      ENUMERATED {ms2, ms3, ms4, ms5, ms6,
ms8, ms10, ms20, ms30,
                                             ms40, ms50, ms 60, ms80, ms100,
ms200, ms300, ms500,
                                             ms750, ms1280, ms1920, ms2560,
spare10, spare9, spare8,
                                             spare7, spare6, spare5, spare4,
spare3, spare2, spare1 }                     OPTIONAL,  -- Need R
    defaultDownlinkBWP-Id                    BWP-Id
OPTIONAL,  -- Need S
    uplinkConfig                             UplinkConfig
OPTIONAL,  -- Need M
    supplementaryUplink                      UplinkConfig
OPTIONAL,  -- Need M
    pdcch-ServingCellConfig                  SetupRelease { PDCCH-
ServingCellConfig }                          OPTIONAL,  -- Need M
    pdsch-ServingCellConfig                  SetupRelease { PDSCH-
ServingCellConfig }                          OPTIONAL,  -- Need M
    csi-MeasConfig                           SetupRelease { CSI-MeasConfig }
OPTIONAL,  -- Need M
    sCellDeactivationTimer                   ENUMERATED {ms20, ms40, ms80, ms160,
ms200, ms240,
                                             ms320, ms400, ms 480, ms520,
ms640, ms720,
                                             ms840, ms1280, spare2,spare1}
OPTIONAL,  -- Cond ServingCellWithoutPUCCH
    crossCarrierSchedulingConfig             CrossCarrierSchedulingConfig
OPTIONAL,  -- Need M
    tag-Id                                   TAG-Id,
    dummy                                    ENUMERATED {enabled}
OPTIONAL,  -- Need R
    pathlossReferenceLinking                 ENUMERATED {spCell, sCell}
OPTIONAL,  -- Cond SCellOnly
servingCellMO                                MeasObjectId
OPTIONAL,  -- Cond MeasObject
    ...,
    [[
    lte-CRS-ToMatchAround                    SetupRelease { RateMatchPatternLTE-
CRS }                                        OPTIONAL,  -- Need M
    rateMatchPatternToAddModList                                 SEQUENCE (SIZE
```

TABLE 10-continued

```
(1..maxNrofRateMatchPatterns))        OF RateMatchPattern        OPTIONAL,  --
Need N
rateMatchPatternToReleaseList                                    SEQUENCE (SIZE
(1..maxNrofRateMatchPatterns))        OF RateMatchPatternId      OPTIONAL,  --
Need N
downlinkChannelBW-PerSCS-List         SEQUENCE (SIZE (1..maxSCSs)) OF SCS-
SpecificCarrier                       OPTIONAL   -- Need S
]],
[[
supplementaryUplinkRelease                                       ENUMERATED { true }
OPTIONAL,  -- Need N
tdd-UL-DL-ConfigurationDedicated-iab-mt-v16xy                    TDD-UL-DL-
ConfigDedicated-IAB-MT-v16xy          OPTIONAL,   -- Need FFS
firstWithinActiveTimeBWP-Id-r16                                  BWP-Id
OPTIONAL,  -- Cond MultipleNonDormantBWP
firstOutsideActiveTimeBWP-Id-r16                                 BWP-Id
OPTIONAL,  -- Cond MultipleNonDormantBWP-WUS
ca-SlotOffset-r16                     CHOICE {
refSCS15kHz                           INTEGER (-2..2),
refSCS30KHz                           INTEGER (-5..5),
refSCS60KHz                           INTEGER (-10..10),
refSCS120KHz                          INTEGER (-20..20)
}
OPTIONAL,  -- Cond AsyncCA
channelAccessConfig-r16                                          ChannelAccessConfig-r16
OPTIONAL   -- Need M
]]
}
UplinkConfig ::=                      SEQUENCE {
initialUplinkBWP                                                 BWP-UplinkDedicated
OPTIONAL,  -- Need M
uplinkBWP-ToReleaseList               SEQUENCE (SIZE (1..maxNrofBWPs)) OF
BWP-Id                                OPTIONAL,  -- Need N
uplinkBWP-ToAddModList                SEQUENCE (SIZE (1..maxNrofBWPs)) OF
BWP-Uplink                            OPTIONAL,  -- Need N
firstActiveUplinkBWP-Id                                          BWP-Id
OPTIONAL,  -- Cond SyncAndCellAdd
pusch-ServingCellConfig                                          SetupRelease { PUSCH-
ServingCellConfig }                   OPTIONAL,  -- Need M
carrierSwitching                      SetupRelease { SRS-CarrierSwitching }
OPTIONAL,  -- Need M
...,
[[
powerBoostPi2BPSK                                                BOOLEAN
OPTIONAL,  -- Need M
uplinkChannelBW-PerSCS-List           SEQUENCE (SIZE (1..maxSCSs)) OF SCS-
SpecificCarrier                       OPTIONAL   -- Need S
]],
[[
bdFactorR-r16                                                    ENUMERATED {n1}
OPTIONAL,  -- Need R
lte-CRS-PatternList-r16               SetupRelease { LTE-CRS-PatternList-
r16 }                                 OPTIONAL,  -- Cond LTE-CRS
lte-CRS-PatternListSecond-r16         SetupRelease { LTE-CRS-PatternList-
r16 }                                 OPTIONAL,   -- Cond CORESETPool
enablePLRS-UpdateForPUSCH-SRS         ENUMERATED         {enabled}
OPTIONAL,  -- Need R
enableDefaultBeamPL-ForPUSCH0         ENUMERATED         {enabled}
OPTIONAL,  -- Need R
enableDefaultBeamPL-ForPUCCH          ENUMERATED         {enabled}
OPTIONAL,  -- Need R
enableDefaultBeamPL-ForSRS            ENUMERATED         {enabled}
OPTIONAL   -- Need R
]]
{
ChannelAccessConfig-r16 :: =          SEQUENCE {
maxEnergyDetectionThreshold-r16       INTEGER (-85..-52),
energyDetectionThresholdoffset-r16    INTEGER (-20..-13),
ul-toDL-COT-SharingED-Threshold-r16   INTEGER (-85..-52)         OPTIONAL,
-- Need R
absenceOfAnyOtherTechnology-r16       ENUMERATED {true}          OPTIONAL
-- Need R
}
-- TAG-SERVINGCELLCONFIG-STOP
-- ASN1STOP
```

Referring to Table 11, each serving cell may be mapped with a specific MO. That is, a specific serving cell may be configured to have a correspondence relation with a specific MO by a field (parameter) for a serving cell measurement target (i.e., servingCellMO) within the ServingCellConfig IE. For example, a field (parameter) for a serving cell measurement target (i.e., servingCellMO) may correspond to a measurement target identifier (MeasObjectID). Therefore, by configuring a specific serving cell index in the QCL information to the terminal, the terminal may utilize the MO information connected to the corresponding serving cell. If the terminal may utilize specific MO information, the method of using the MO information described in the above-described embodiment #A1-1 may be applied as it is in this case.

On the other hand, the QCL information (i.e., QCL-Info) within the IE (i.e., TCI-State IE) for the TCI state previously exemplified in Table 6 is a field (parameter) for a cell that can already point to a specific serving cell (i.e., cell) (e.g., indicating a serving cell index (ServCellIndex)) is defined. Therefore, in a specific case (e.g., when the base station configures/indicates a separate indicator/parameter), by extending the function of the existing parameter to apply the above-described proposed method, the field (parameter) for the cell (i.e., cell) may function as an indication of the MO connected to the serving cell. Meanwhile, in this case, the terminal may assume that specific parameter(s) (e.g., BWP identifier (bwp-Id)) among existing parameters in QCL information (QCL-Info) is not configured/applied.

The above proposed method is summarized as follows. The base station may configure/indicate to the terminal serving cell information (e.g., serving cell index)/PCI/SSB index, etc. in order to configure the reference RS to the SSB of the non-serving cell in the QCL information (QCL-info) within the serving cell. Here, the SSB corresponding to the SSB index may correspond to the PCI, and the PCI may be a one value of the PCIs included in a specific MO corresponding to the MO ID connected to the serving cell corresponding to the serving cell index. The terminal may assume that the SSB corresponding to the SSB index is transmitted based on the time/frequency resource domain defined in the MO corresponding to the MO ID. The PCI may be defined to be one of PCI values included in a white cell list configured in the MO.

On the other hand, unlike the above method, by configuring a specific serving cell index by the base station, or/and based on the configuration value/indication to operate based on the method proposed below, it may be assumed that the resource region of the SSB transmitted from the serving cell and the resource region of the SSB transmitted from the non-serving cell are the same. For example, in the initial access step, the terminal may secure approximate information on frequency resources and time resources through which PSS/SSS/PBCH are transmitted through a cell search procedure. In addition, through a process of decoding the PBCH and acquiring the remaining system information, accurate time domain information in which the SSB of the serving cell is located may be known. This may be configured in the terminal through an IE (i.e., ServingCellConfig-Common IE/ServingCellConfigCommonSIB IE) for serving cell common configuration for configuring cell-specific parameters of the serving cell of the terminal. Here, in the case of the ServingCellConfigCommon IE, through the field (parameter) for the SSB period of the serving cell (i.e., ssb-periodicityServingCell), the field (parameter) for the time domain position of the SSB (i.e., ssb-PositionsInBurst), the field (parameter) for the subcarrier interval of the SSB (ie, ssbSubcarrierSpacing), a transmission period of the SSB, a SSB index actually transmitted in a half frame, and SSB subcarrier spacing information may be configured. In the case of ServingCellConfigCommonSIB IE, the field (parameter) for the SSB period of the serving cell (i.e., ssb-PeriodicityServingCell), the field (parameter) for the time domain position of the SSB (i.e., ssb-PositionsInBurst), the SSB transmission period, half SSB index information actually transmitted within a half frame may be configured. That is, the terminal may recognize the transmission resource (time/frequency) location of the SSB corresponding to the serving cell(s) through the initial access stage and subsequent configuration value from the base station. Based on the proposed method, it may be assumed that the transmission resource position of the non-serving cell SSB is the same as the transmission resource position of the serving cell SSB.

The above proposed method is summarized as follows. In order to configure the reference RS to the SSB of the non-serving cell in the QCL information within the serving cell, the base station may configure/indicate to the terminal configuration (or indication) value/PCI/SSB index, etc. indicating that the serving cell information (e.g., serving cell index)/transmission resource region of the non-serving cell SSB is the same as the SSB transmission resource region of the serving cell. Here, the SSB corresponding to the SSB index may correspond to the PCI. The terminal may assume that the SSB corresponding to the SSB index is transmitted based on the time/frequency resource domain of the SSB configured for the serving cell.

Embodiment #A1-3: In order to configure SSB information of a non-serving cell, the base station may configure/indicate to the terminal time/frequency resource information/physical cell ID (PCI)/SSB index of the SSB of the non-serving cell.

In the proposed method of the above embodiments #A1-1/#A1-2, by using MO information that may be already configured for other purposes (e.g., RRM measurement) for the terminal, in the QCL information within the serving cell, a method for configuring the reference RS to the SSB of the non-serving cell is proposed.

In the present embodiment, a method of directly configuring resource information for an SSB of a non-serving cell without utilizing previously configured MO information may also be considered. When this method is applied, the range of the non-serving cell may be extended to a wider range than that of a neighboring cell configured to the terminal in the form of an MO. For example, the SSB of a neighboring cell in which the terminal is not performing RRM measurement may be configured as a reference RS in QCL information within the serving cell. In order to inform the terminal of the SSB time/frequency resource information of the non-serving cell, the following values (e.g., frequency domain information/time domain information, etc.) may be configured/indicated to the terminal.

- Frequency domain information: carrier frequency (e.g., Absolute Radio Frequency Channel Number (AFRCN) (e.g., higher layer parameter ARFCN-ValueNR)/subcarrier spacing, etc.
- Time domain information: transmission period/transmission position of the first SSB within transmission period (e.g., frame position (e.g., system frame number, etc.)/half frame position/symbol position etc.)/Index of actually transmitted (or not transmitted) SSB, etc.

As an example of a method for configuring time domain information among the proposed values, a higher layer IE (i.e., SSB-MTC IE) for SSB measurement timing configuration (MTC) defined in the current standard may be used. The SSB-MTC IE is used for a configuration measurement timing, that is, configuring timing occasions at which the terminal specifies SSBs.

Table 11 illustrates a higher layer IE (i.e., SSB-MTC IE) for SSB measurement timing configuration (MTC).

A higher layer IE for SSB measurement timing configuration (i.e., SSB-MTC IE) is used to configure measurement timing configuration, that is, timing occasions at which the terminal specifies SSBs.

TABLE 11

```
-- ASN1START
-- TAG-SSB-MTC-START
SSB-MTC ::=                       SEQUENCE {
    periodicityAndOffset              CHOICE {
        sf5                               INTEGER (0..4),
        sf10                              INTEGER (0..9),
        sf20                              INTEGER (0..19),
        sf40                              INTEGER (0..39),
        sf80                              INTEGER (0..79),
        sf160                             INTEGER (0..159)
    },
    duration                          ENUMERATED { sf1, sf2, sf3, sf4, sf5 }
}
SSB-MTC2 ::=                      SEQUENCE {
    pci-List                          SEQUENCE (SIZE (1..maxNrofPCIsPerSMTC))
        OF PhysCellId                 OPTIONAL,   -- Need M
    periodicity                       ENUMERATED {sf5, sf10, sf20, sf40, sf80, spare3, spare2, spare1}
}
SSB-MTC2-LP-r16 ::=               SEQUENCE {
    pci-List                          SEQUENCE (SIZE (1..maxNrofPCIsPerSMTC))
        OF PhysCellId                 OPTIONAL,   -- Need R
    periodicity                       ENUMERATED {sf10, sf20, sf40, sf80, sf160, spare3, spare2, spare1}
}
SSB-MTC3-r16 ::=                  SEQUENCE {
    ssb-MTC-Periodicity-r16           ENUMERATED {ms5, ms10, ms20, ms40, ms80, ms160, ms320, ms640, ms1280},
    ssb-MTC-Timingoffset-r16          INTEGER (0..127),
    ssb-MTC-Duration-r16              ENUMERATED {sf1, sf2, sf3, sf4, sf5},
    ssb-MTC-pci-List-r16              SEQUENCE (SIZE (0..63)) OF PhysCellId,
    ssb-ToMeasure-r16                     SetupRelease { SSB-ToMeasure }
        OPTIONAL   -- Need M
}
-- TAG-SSB-MTC-STOP
-- ASN1STOP
```

Referring to Table 11, the terminal may identify the transmission location of the first SSB to be transmitted based on a period value and an offset value within the period value in units of frame/subframe units.

More specifically, a field for period and offset (parameter) (i.e., periodicityAndOffset) indicates the period and offset of the measurement window for receiving SS/PBCH blocks, and the period and offset are given as the number of subframes. Therefore, the terminal may find the frame position where the first SSB is transmitted in units of frames/subframes through fields (parameters (i.e., periodicityAndOffset) values for period and offset in SSB-MTC.

In addition, a parameter capable of indicating in which half frame the SSB is transmitted may be additionally defined. In this case, since the terminal may configure the exact location of the SSB, it may have an advantage of reducing complexity.

In addition to the above proposal, in order to inform the transmission location of the first SSB within the SSB transmission period of the non-serving cell to the terminal (or, offset value (frame/half frame units)) for SSB transmission within the transmission period, the offset value for the frame/half frame in which the first SSB is transmitted in the non-serving cell based on the serving cell's specific system frame number (SFN: system frame number) (eg, SFN0) may be configured. For example, 0, 1, 2, 3, . . . , etc. may be configured based on SFN0, and in this case, the terminal may assume SFN0, SFN1, SFN2, SFN3 as the starting point of the SSB transmission period. Even in this case, as described above, the base station may separately provide a specific half frame. Alternatively, if the value for the location where the first SSB is transmitted is defined to be interpreted in half frame units, the terminal may assume the first half frame of SFN0, the second half frame of SFN0, the first half frame of SFN1, and the second half frame of SFN1 as the starting point of each SSB transmission period.

Meanwhile, methods for more efficiently configuring the above-described proposed values to the terminal may be additionally applied.

This is because it is possible to reduce the amount of information according to the method of configuring the above suggested values, thereby reducing signaling overhead. As a specific example, a PCI list composed of time/frequency resource information of the SSB of a non-serving cell and one or more PCIs corresponding to the resource information may be defined. In this case, there is an advantage in that time/frequency resource information of the SSB corresponding to each PCI does not need to be individually configured for all PCIs. For example, when a PCI list is configured according to the above proposed method, the base station configures a specific PCI/SSB index in the PCI list to the terminal, so that the terminal may utilize determines the time/frequency resource information of the SSB corresponding to the PCI list including the PCI.

Figure 7:
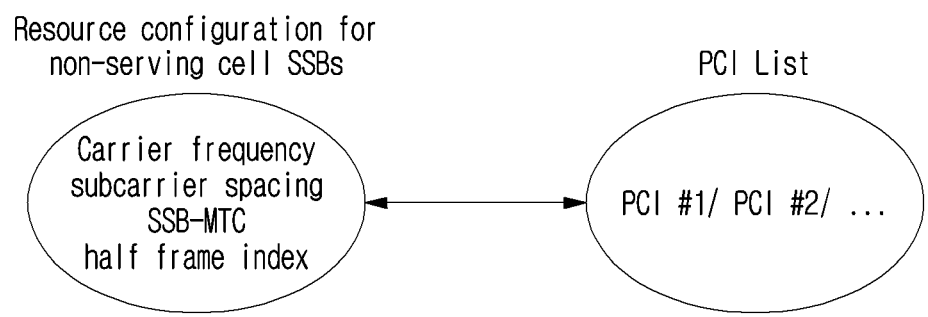
FIG. 7 is a diagram illustrating a method of configuring resources for SSBs of a non-serving cell in QCL information according to an embodiment of the present disclosure.

FIG. 7 is a diagram illustrating a method of configuring resources for SSBs of a non-serving cell in QCL information according to an embodiment of the present disclosure.

Referring to FIG. 7, in order to configure a resource region of a non-serving cell SSB, carrier frequency/subcarrier spacing/SSB-measurement timing configuration (SSB-MTC)/half frame index (half frame index) is defined. With respect to the above specific setting values, a PCI list composed of specific PCI values may be matched as shown in FIG. 7. That is, the PCI list composed of PCI #1, PCI #2, etc. in FIG. 7 means that the same resource region of the non-serving cell SSB is configured.

And when a specific PCI in the QCL information is configured in the terminal, the resource domain information (carrier frequency/subcarrier spacing)/SSB-measurement timing configuration corresponding to the PCI list including the PCI An operation may be performed based on (SSB-MTC)/half frame index.

In order to support a plurality of resource region information (i.e., independent resource region information for each PCT list), a correspondence relation as shown in FIG. 7 may be configured for a plurality of PCI lists.

Here, the PCI list may be defined to have a characteristic that PCI does not overlap among the PCI lists.

Alternatively, when PCIs in different PCI lists may overlap, a method of notifying which PCIs are in a corresponding PCI list may be additionally applied. For example, an index is defined for the corresponding relation (e.g., linkage #1, linkage #2, linkage #3, . . . in FIG. 8), and an index for a correspondence relation may be configured in a terminal. That is, an index for a correspondence relation with a specific PCI in QCL information may be configured in the terminal.

Alternatively, in order to support a plurality of resource domain information, a correspondence relation may be configure for a plurality of PCI lists as shown in FIG., and the base station may indicate a specific correspondence relation and inform the number of PCIs in the PCI list of the corresponding correspondence relation.

Figure 8:
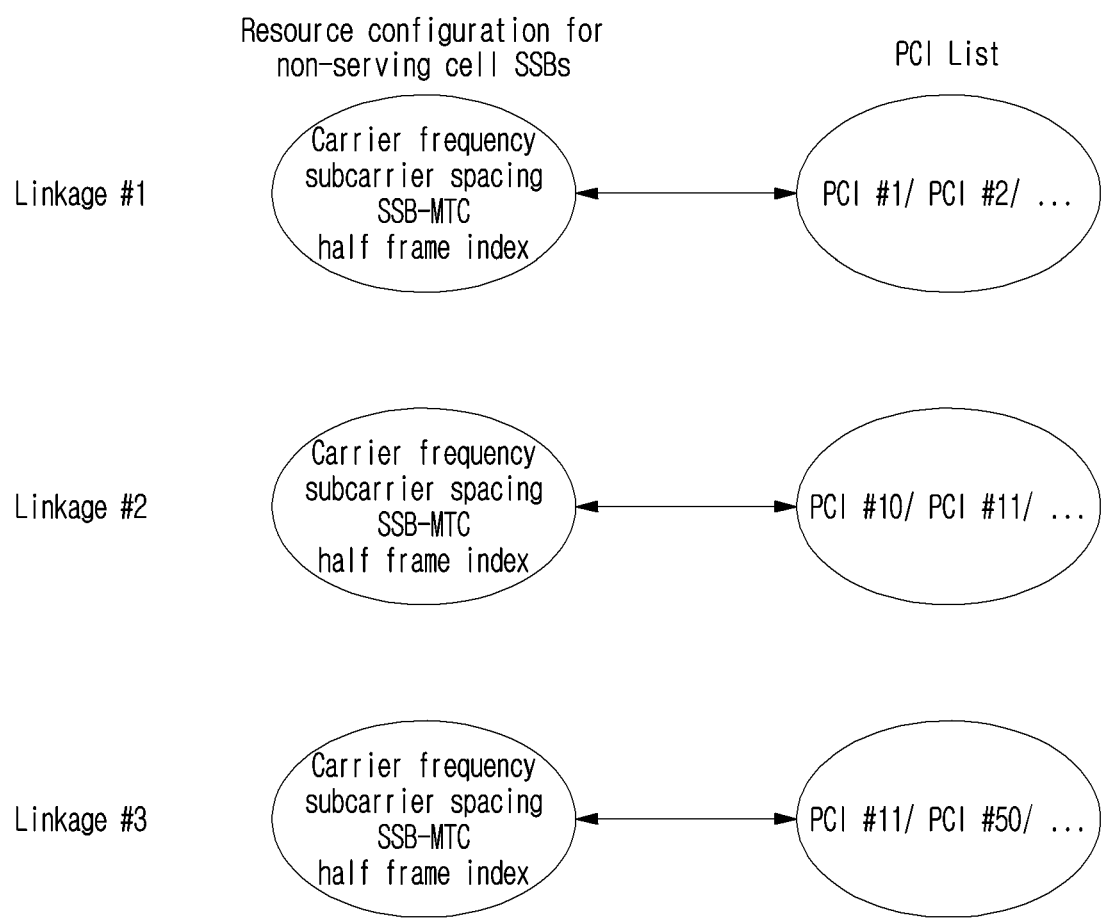
FIG. 8 is a diagram illustrating a method of configuring resources for SSBs of a non-serving cell in QCL information according to an embodiment of the present disclosure.

In FIG. 8 below, as an example of the above-described proposed method, a correspondence relation between a plurality of PCI lists and a plurality of resource region information is illustrated.

FIG. 8 is a diagram illustrating a method of configuring resources for SSBs of a non-serving cell in QCL information according to an embodiment of the present disclosure.

Referring to FIG. 8, PCI #1, PCI #2, . . . correspond to specific resource region information 1 and linkage #1, and PCI #10, PCI #11, . . . correspond to specific resource region information 2 by linkage #2, and PCI #11, PCI #50, . . . correspond to specific resource region information 3 by linkage #3. In this case, the base station may configure a linkage index and a PCI index in the PCI list of the corresponding linkage (e.g., the actual PCI corresponding to PCI index 0 in linkage #3 is PCI #11) and SSB index in the terminal.

Embodiment #A2: Method for Configuring Power of Non-Serving Cell SSB

In the proposed method of the above-described embodiment #A1-1/#A1-2/#A1-3, in order to use the SSB of a non-serving cell as a reference RS in QCL information within a serving cell, the following methods may be considered together.

The base station may define a parameter for SS/PBCH block power (ss-PBCH-BlockPower) in a power such as resources/physical channels with different SSBs corresponding to the serving cell of the terminal (e.g., IE (i.e., ServingCellConfigCommon IE)/ServingCellConfigCommonSIB IE) for serving cell common configuration to serve as a criterion for energy per resource element (EPRE)).

A parameter for SS/PBCH block power (ss-PBCH-BlockPower) indicates an average EPRE of resource elements carrying a secondary synchronization signal in dBm used by a network (NW) for SSB transmission.

The SS/PBCH block power parameter (ss-PBCH-BlockPower) targets the SSB corresponding to the serving cell of the terminal. Therefore, in the case of the SSB corresponding to the non-serving cell, it may not be guaranteed that the SS/PBCH block power parameter (ss-PBCH-BlockPower) value is followed as it is. Therefore, in this case, in order to inform the terminal of the exact power of the SSB corresponding to the non-serving cell, the base station may configure parameters (ss-PBCH-BlockPower) for SS/PBCH block power for the SSB corresponding to the PCI of the non-serving cell to the terminal for a non-serving cell having a PCI different from that of the serving cell. In addition, the resource/physical channels in which the SSB corresponding to the non-serving cell is connected to the TCI-State set as the reference RS in the QCL information within the serving cell (i.e., the resource of the serving cell in which the SSB of the non-serving cell is set as the reference RS)/Physical channels) may perform related operations based on a parameter (ss-PBCH-BlockPower) for SS/PBCH block power for PCI corresponding to the non-serving cell SSB. That is, operations previously performed based on the SS/PBCH block power parameter (ss-PBCH-BlockPower) of the serving cell may be performed a parameter for SS/PBCH block power (ss-PBCH-BlockPower) for the PCI corresponding to the non-serving cell SSB.

More specifically, for a non-serving cell having a PCI different from that of the serving cell, a parameter for SS/PBCH block power (ss-PBCH-BlockPower) for an SSB corresponding to the PCI of the non-serving cell may be configured to the terminal in the form of an offset value based on a parameter value for SS/PBCH block power (ss-PBCH-BlockPower) for the serving cell SSB.

Table 12 illustrates a higher layer IE (i.e., NZP-CSI-RS-Resource IE) for NZP CSI-RS resources.

A higher layer IE for NZP CSI-RS resources (i.e., NZP-CSI-RS-Resource IE) may be configured to be measured by a terminal and used to configure a NZP CSI-RS transmitted within a cell including this IE. Changes in configuration between periodic, semi-persistent, and aperiodic for NZP CSI-RS resources are not supported without release and addition.

TABLE 12

```
-- ASN1START
-- TAG-NZP-CSI-RS-RESOURCE-START
NZP-CSI-RS-Resource ::=         SEQUENCE {
    nzp-CSI-RS-ResourceId           NZP-CSI-RS-ResourceId,
    resourceMapping                 CSI-RS-ResourceMapping,
    powerControlOffset              INTEGER (-8..15),
```

TABLE 12-continued

```
powerControlOffsetSS                    ENUMERATED {db-3, db0, db3, db6}
OPTIONAL,   -- ASN1START
-- TAG-CSI-RS-RESOURCECONFIGMOBILITY-START
CSI-RS-ResourceConfigMobility ::=       SEQUENCE {
    subcarrierSpacing                   SubcarrierSpacing,
    csi-RS-CellList-Mobility            SEQUENCE (SIZE (1..maxNrofCSI-RS-
CellsRRM)) OF CSI-RS-CellMobility,
    ...,
    [[
    refServCellIndex                    ServCellIndex
OPTIONAL   -- Need S
    ]]
}
CSI-RS-CellMobility ::=                 SEQUENCE {
    cellId                              PhysCellId,
    csi-rs-MeasurementBW                SEQUENCE {
        nrofPRBs                        ENUMERATED { size24, size48, size96,
size192, size264},
        startPRB                        INTEGER (0..2169)
    },
    density                             ENUMERATED {d1, d3}
OPTIONAL, -- Need R
    csi-rs-ResourceList-Mobility        SEQUENCE (SIZE (1..maxNrofCSI-RS-
ResourcesRRM)) OF CSI-RS-Resource-Mobility
}
CSI-RS-Resource-Mobility ::=            SEQUENCE {
    csi-RS-Index                        CSI-RS-Index,
    slotConfig                          CHOICE {
        ms4                             INTEGER (0..31),
        ms5                             INTEGER (0..39),
        ms10                            INTEGER (0..79),
        ms20                            INTEGER (0..159),
        ms40                            INTEGER (0..319)
    },
    associatedSSB                       SEQUENCE {
        ssb-Index                       SSB-Index,
        isQuasiColocated                BOOLEAN
    }
OPTIONAL, -- Need R
    frequencyDomainAllocation           CHOICE {
        row1                            BIT STRING (SIZE (4)),
        row2                            BIT STRING (SIZE (12))
    },
    firstOFDMSymbolInTimeDomain         INTEGER (0..13),
    sequenceGenerationConfig            INTEGER (0..1023),
    ...
}
CSI-RS-Index ::=                        INTEGER (0..maxNrofCSI-RS-ResourcesRRM-1)
-- TAG-CSI-RS-RESOURCECONFIGMOBILITY-STOP
-- ASN1STOP
```

Referring to Table 12, the parameter for power control offset (powerControlOffsetSS) indicates the power offset of the NZP CSI-RS RE in preparation for the secondary synchronization signal (SSS) RE in units of dB.

As shown in Table 12, when configuring sthe NZP CSI-RS resource, the power offset value (i.e., powerControlOffsetSS) of the corresponding NZP CSI-RS RE and SSS RE may be configured. In the current standard, the above power offset value is applied based on the ss-PBCH-Block-Power value configured based on the serving cell SSB.

On the other hand, if one or more ss-PBCH-BlockPower values corresponding to different PCIs are defined according to the above proposed method, the base station may configure/indicate the terminal whether the above power offset value should be applied based on which PCI corresponds to ss-PBCH-BlockPower.

And/or, each NZP CSI-RS resource may be mapped with a specific TCI-State to inform QCL information, and an implicit rule may be defined to apply the power offset value based on ss-PBCH-BlockPower corresponding to the PCI corresponding to the reference RS constituting the TCI-State. That is, the power offset value may be applied based on the ss-PBCH-BlockPower for the PCI indicated in the QCL information of the NZP CSI-RS resource in the TCI-state.

According to the above proposed method, the power offset value to be applied to the NZP CSI-RS resource may be applied based on the resource of the serving cell or the resource of the non-serving cell.

On the other hand, when the CSI-RS for mobility of a non-serving cell is configured/indicated as a reference RS in QCL information for a physical channel/signal of a serving cell, for the same reason as the reason for informing the power of the non-serving cell SSB above, the base station may configure a power value for the CSI-RS for mobility of the non-serving cell (e.g., based on a parameter similar to ss-PBCH-BlockPower) to the terminal.

For example, the power value of the mobility CSI-RS of the non-serving cell may be configured to the terminal in the form of an offset value based on the ss-PBCH-BlockPower value for the serving cell SSB and/or the non-serving cell SSB of the same PCI as the non-serving cell mobility CSI-RS. In addition, the resource/physical channels in which the CSI-RS for mobility corresponding to the non-serving cell is connected to the TCI-State configured as the reference RS in the QCL information within the serving cell may perform related operations (previously performed based on the ss-PBCH-BlockPower value of the serving cell) based on a power value corresponding to the non-serving cell mobility CSI-RS. For example, an offset value relative to the power value of the non-serving cell mobility CSI-RS may be configured/indicated for each CSI-RS resource of a serving cell.

Embodiment #A3: Method of Puncturing/Rate Matching Other Resource/Physical Channels in Serving Cell to Protect Non-Serving Cell SSB In the current standard, in order to prevent interference from other resource/physical channels in the SSB corresponding to the serving cell, other resource/physical channels are punctured/rate-matching in the area where the SSB is transmitted. Currently, such puncturing/rate matching is not considered in the case of non-serving cell SSB.

However, when trying to use the SSB of a non-serving cell as a reference RS in QCL information within a serving cell, as in the method proposed in the above embodiments #A1-1/#A1-2/#A1-3, the SSB of the non-serving cell may also be considered to protect like the SSB of the serving cell. That is, in this case, for a resource region in which a specific non-serving cell SSB is transmitted, another resource/physical channel within a serving cell may be puncturing/rate matching. The resource region in which the specific non-serving cell SSB is transmitted may be defined based on the proposed method of embodiments #A1-1/#A1-2/#A1-3. In addition, the specific non-serving cell SSB may be defined/configured within an SSB included in the SSB configured/indicated as a reference RS in the QCL information within the serving cell.

Alternatively, a specific PCI/SSB index that is a standard for performing puncturing/rate matching among non-serving cell SSBs defined based on the proposed method of the above embodiments #A1-1/#A1-2/#A1-3 may be configured/indicated by the base station to the terminal. In this case, puncturing/rate matching may be performed only for the non-serving cell SSB that is actually utilized in the serving cell (i.e., for QCL reference RS use). Accordingly, it is possible to prevent system efficiency from deteriorating due to excessive puncturing/rate matching of resources of the serving cell due to the SSB of the non-serving cell. For the above proposed method, the non-serving cell SSB may have the same priority as the serving cell SSB.

On the other hand, when the CSI-RS for mobility of a non-serving cell is configured/indicated as a reference RS in the QCL information within the serving cell, the CSI-RS for mobility of the non-serving cell may be also applied with a method (for example, puncturing/rate matching) to protect from interference caused by other resource/physical channels within the serving cell. In this case, the method for protecting the non-serving cell SSB described above may be equally applied to protecting the CSI-RS for mobility of the non-serving cell. In this case, the CSI-RS for mobility of the non-serving cell may have the same priority as the non-serving cell SSB and/or the serving cell SSB.

Embodiment #A4: Method for Configuring CSI-RS for Mobility of Non-Serving Cell (i.e., CSI-RS for RRM Measurement) Information Meanwhile, in QCL information within a serving cell, a reference RS may be configured to a CSI-RS for mobility of a non-serving cell. This is because the CSI-RS for mobility of a non-serving cell can have a larger beamforming gain than the SSB of the non-serving cell, and thus may have a wider coverage than the SSB. Therefore, even when the terminal does not receive the SSB of the non-serving cell, the reference RS of the QCL information in the serving cell based on the CSI-RS for mobility may be configured to the non-serving cell resource.

The following proposal describes a method of configuring a reference RS of QCL information in a serving cell to a CSI-RS for mobility of a non-serving cell.

Embodiment #A4-1: The base station may configure/indicate measurement object (MO) information (e.g., MO ID)/Physical Cell ID (PCI)/CSI-RS index, etc. to the terminal to configure CSI-RS information for mobility of a non-serving cell. Here, the PCI may be one of the PCIs included in the MO ID, and the CSI-RS index may correspond to one of the CSI-RSs corresponding to the PCI included in the MO ID.

Table 13 exemplify a higher layer IE for mobility CSI-RS resource configuration capable of configuring CSI-RS information for mobility (i.e., CSI-RS-ResourceConfigMobility IE) within a higher layer IE for the measurement target that may be configured for RRM measurement to the terminal (i.e., MeasObjectNR IE).

A higher layer IE for configuring mobility CSI-RS resources (i.e., CSI-RS-ResourceConfigMobility IE) is used to configure CSI-RS based RRM measurement.

TABLE 13

```
-- ASN1START
-- TAG-CSI-RS-RESOURCECONFIGMOBILITY-START
CSI-RS-ResourceConfigMobility ::=      SEQUENCE {
   subcarrierSpacing                   SubcarrierSpacing,
   csi-RS-CellList-Mobility                SEQUENCE (SIZE (1..maxNrofCSI-RS-
CellsRRM)) OF CSI-RS-CellMobility,
   ...,
   [[
   refServCellIndex                    ServCellIndex
OPTIONAL -- Need S
   ]]
}
CSI-RS-CellMobility ::=                SEQUENCE {
   cellId                              PhysCellId,
   csi-rs-MeasurementBW                   SEQUENCE {
      nrofPRBs                            ENUMERATED { size24, size48, size96,
size192, size264},
      startPRB                            INTEGER (0 .. 2169)
   },
```

TABLE 13-continued

```
  density                                    ENUMERATED {d1, d3}
OPTIONAL,   -- Need R
  csi-rs-ResourceList-Mobility               SEQUENCE (SIZE (1..maxNrofCSI-RS-
ResourcesRRM)) OF CSI-RS-Resource-Mobility
}
CSI-RS-Resource-Mobility ::=               SEQUENCE {
  csi-RS-Index                               CSI-RS-Index,
  slotConfig                                 CHOICE {
    ms4                                        INTEGER (0..31),
    ms5                                        INTEGER (0..39),
    ms10                                       INTEGER (0..79),
    ms20                                       INTEGER (0..159),
    ms40                                       INTEGER (0..319)
  },
  associatedSSB                              SEQUENCE {
    ssb-Index                                  SSB-Index,
    isQuasiColocated                             BOOLEAN
  }
OPTIONAL,   -- Need R
  frequencyDomainAllocation                  CHOICE {
    row1                                       BIT STRING (SIZE (4)),
    row2                                       BIT STRING (SIZE (12))
  },
  firstOFDMSymbolInTimeDomain                INTEGER (0..13),
  sequenceGenerationConfig                   INTEGER (0..1023),
  ...
}
CSI-RS-Index ::=               INTEGER (0..maxNrofCSI-RS-ResourcesRRM-1)
-- TAG-CSI-RS-RESOURCECONFIGMOBILITY-STOP
-- ASN1STOP
```

Referring to Table 8 above, information on a CSI-RS for mobility that may be included in a specific measurement object (MO) is included. For example, a field/parameter (i.e., referenceSignalConfig) for reference signal configuration within the MO may be included. A field/parameter for reference signal configuration (i.e., referenceSignalConfig) is used to configure reference signals for the SS/PBCH block and CSI-RS. And, based on the field/parameter for reference signal configuration (i.e., referenceSignalConfig), a field/parameter for CSI-RS configuration for mobility (i.e., csi-rs-ResourceConfigMobility) (i.e., Table 13) may be configured.

For example, a reference point (i.e., Point A) value for resource mapping of CSI-RS to physical resources through a parameter (i.e., refFreqCSI-RS) for a CSI-RS reference frequency in the MO may be configured. And, as shown in Table 13, a specific time/frequency resource region for the mobility CSI-RS may be configured through parameters in the higher layer IE for configuring mobility CSI-RS resources (i.e., CSI-RS-ResourceConfigMobility IE) as follows.

A field (parameter) for a CSI-RS index (i.e., csi-RS-Index) indicates a CSI-RS index related to a CSI-RS resource to be measured (and used for reporting). A field (parameter) for slot configuration (i.e., slotConfig) indicates a period (in milliseconds) for CSI-RS and an offset (in units of the number of slots) for each period. A field (parameter) for the first OFDM symbol in the time domain (i.e., firstOFDMSymbolInTimeDomain) indicates time domain resource allocation within a physical resource block and indicates the first OFDM symbol within a physical resource block used for CSI-RS. The field (parameter) for the CSI-RS measurement bandwidth (i.e., csi-rs-MeasurementBW) indicates the frequency bandwidth for CSI-RS measurement, and the field (parameter) for the number of physical resource blocks (PRBs) (i.e., nrofPRBs) indicates the size of the measurement bandwidth in units of PRBs. A field (parameter) for frequency domain density (i.e., density) indicates the frequency domain density of the 1-port CSI-RS for L3 measurement (i.e., RRM measurement). A field (parameter) for frequency domain allocation (i.e., frequencyDomainAllocation) indicates a frequency domain allocation within the PRB. In the frequency domain, the field (parameter) for subcarrier spacing (i.e., subcarrierSpacing) indicates the subcarrier spacing of CSI-RS, 15, 30 or 60 kHz (for FR1), 60 or 120 kHz (for FR2) is applied.

Accordingly, the base station may configure CSI-RS information (e.g., time/frequency resource domain, corresponding PCI, etc.) for mobility of a non-serving cell to the terminal based on specific MO information and a higher layer IE for configuring mobility CSI-RS resources (i.e., CSI-RS-ResourceConfigMobility IE) included in the corresponding MO.

The above proposed method is summarized as follows. In order to configure reference RS as CSI-RS for mobility of non-serving cell in QCL information in serving cell, the base station may configure/indicate MO information (e.g., MO ID)/PCI/CSI-RS index (e.g., csi-RS-Index in CSI-RS-Resource-Mobility) to the terminal. In this case, the CSI-RS for mobility corresponding to the CSI-RS index may correspond to the PCI. For the resource information of the CSI-RS, the terminal may refer to the field (parameter) value of the cell of the mobility CSI-RS (i.e., CSI-RS-CellMobility) corresponding to the PCI within the MO corresponding to the MO ID and the CSI-RS-ResourceConfigMobility configured in the MO. That is, the terminal may refer to CSI-RS-CellMobility whose CellId corresponds to the PCI. In this case, the PCI may be one of PCI values included in a specific MO corresponding to the MO ID. For the above PCI, it may be one of the PCI values included in the white cell list set in the MO.

Figure 9:
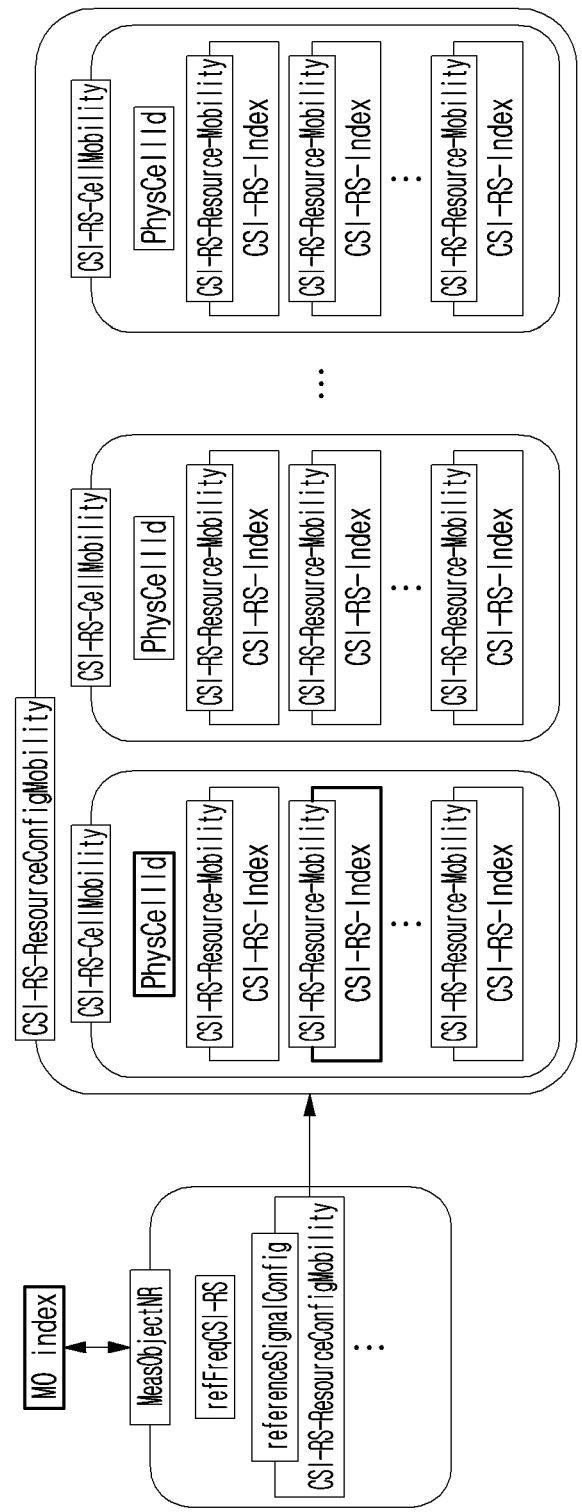
FIG. 9 is a diagram illustrating a method of configuring a CSI-RS resource for mobility of a non-serving cell in QCL information according to an embodiment of the present disclosure.

FIG. 9 is a diagram illustrating a CSI-RS resource configuration method for mobility of a non-serving cell in QCL information according to an embodiment of the present disclosure.

Referring to FIG. 9, one or more MOs (MeasObjectNRs) may be configured in a terminal, and each MO (MeasObjectNR) may be identified by a MO ID (MO index). In addition, mobility CSI-RS resource configuration (CSI-RS-ResourceConfigMobility) may be configured within each MO (MeasObjectNR). Within the mobility CSI-RS resource configuration (CSI-RS-ResourceConfigMobility), cells for one or more mobility CSI-RSs (CSI-RS-CellMobility) may be configured, and cells for each mobility CSI-RS (CSI-RS-CellMobility) may be identified as PCI (PhysCellId). In addition, one or more mobility CSI-RS resources (CSI-RS-Resource-Mobility) may be configured in a cell for each mobility CSI-RS (CSI-RS-CellMobility), and each mobility CSI-RS resource (CSI-RS-Resource-Mobility) may be identified as a CSI-RS index (CSI-RS-index).

As described above, MO ID (MO index)/PCI/CSI-RS index in QCL information may be configured for the terminal. The terminal may refer to a specific CSI-RS resource based on MO ID (MO index)/PCI/CSI-RS index. Specifically, the terminal may refer to a CSI-RS resource corresponding to a specific CSI-RS index within CSI-RS-CellMobility (i.e., CSI-RS-Resource-Mobility) corresponding to a specific PCI within CSI-RS-ResourceConfigMobility within an MO (i.e., MeasObjectNR) corresponding to a specific MO ID (MO index).

Meanwhile, in addition to the above proposed method, the following items may also be considered. Field (parameter) for frequency domain density within a cell for mobility CSI-RS (CSI-RS-CellMobility) that may correspond to different PCI within mobility CSI-RS resource configuration (CSI-RS-ResourceConfigMobility) (i.e., density) may be configured. The density of the frequency domain of the CSI-RS may be configured through a field (parameter) for the frequency domain density (i.e., density).

Figure 10:
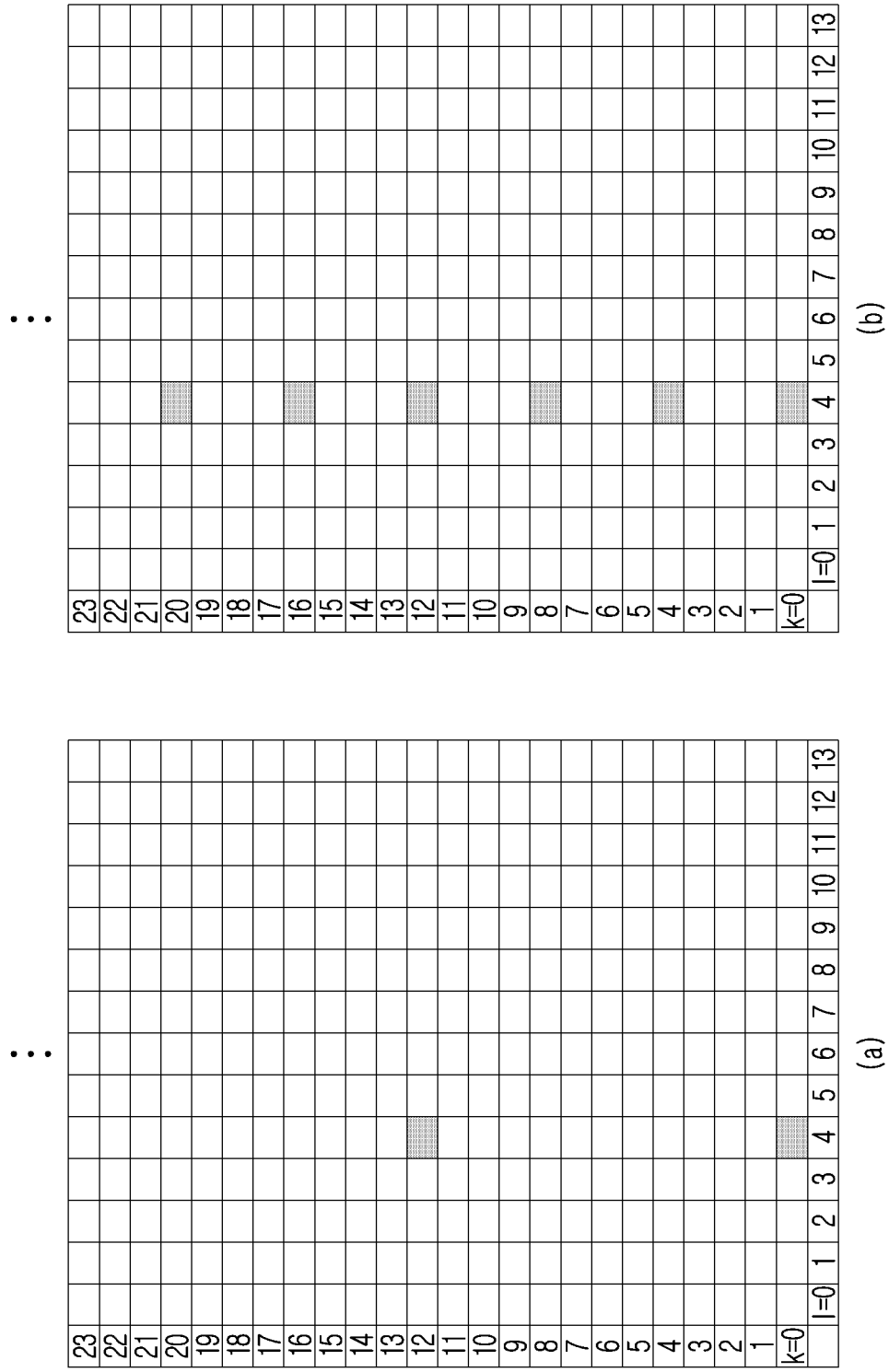
FIG. 10 illustrates a mobility CSI-RS pattern in a frequency domain according to density according to an embodiment of the present disclosure.

FIG. 10 illustrates a mobility CSI-RS pattern in a frequency domain according to density according to an embodiment of the present disclosure.

FIG. 10 (a) illustrates a mobility CSI-RS pattern in the frequency domain when the density is 1, and FIG. 10 (b) illustrates a mobility CSI-RS pattern in the frequency domain when the density is 3.

Referring to FIG. 10(a), in the case of a density of 1, only one sample value exists within one RB (i.e., one RE for k from 0 to 11, and one RE for k from 12 to 23). Therefore, in this case, the sample value in the frequency domain and time domain is too small, and based on this, the channel characteristics that can be derived by the terminal may not be accurate. Therefore, among the QCL types currently defined in the standard, it may be seen that the type configured as the reference RS based on the pattern does not exist among the types A/B/C. The description below shows examples of QCL types defined in the current standard.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

Figure 11:
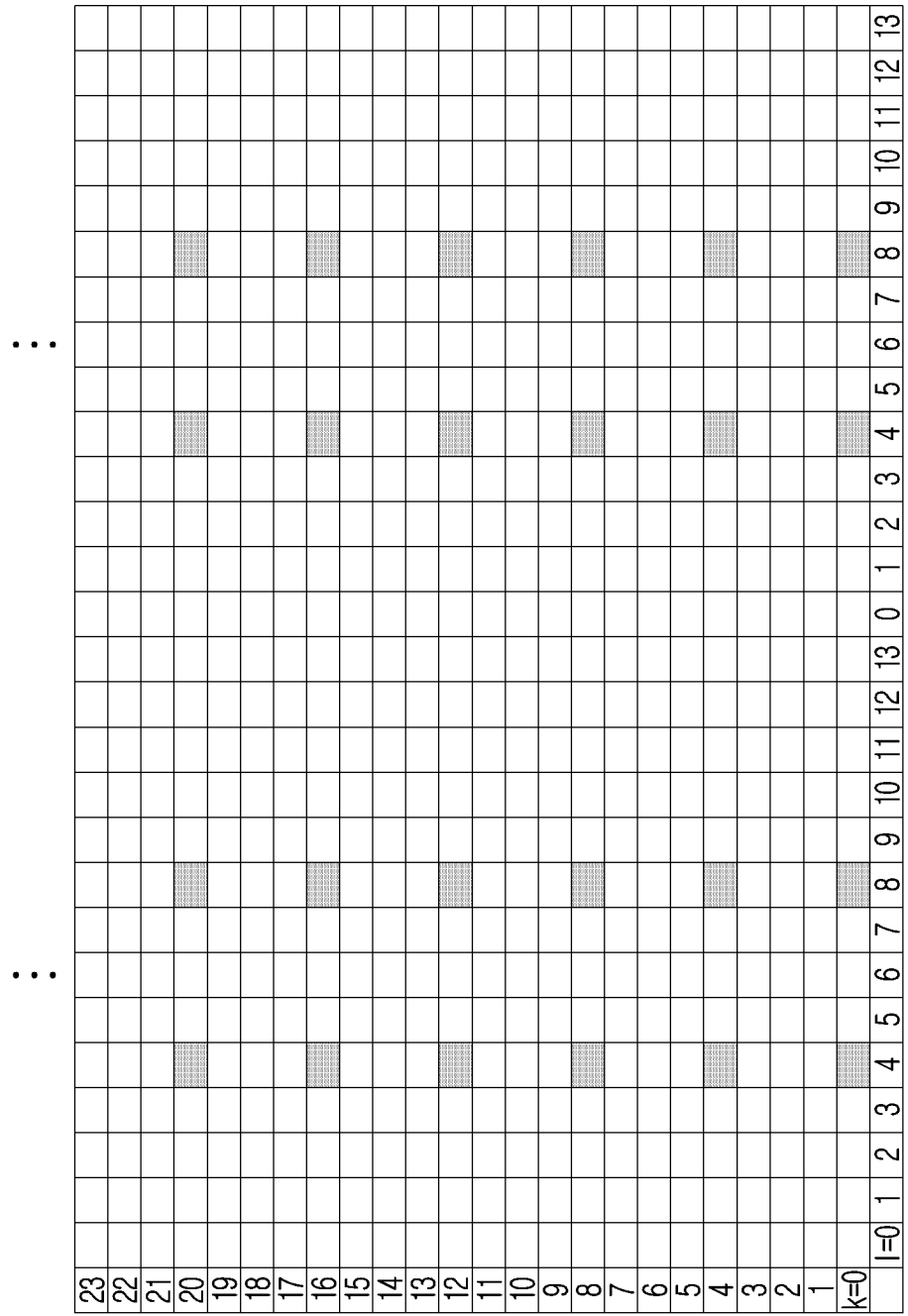
FIG. 11 illustrates a pattern of a tracking reference signal according to an embodiment of the present disclosure.

On the other hand, in the case of density 3, as shown in FIG. 10 (b), there are three sample values within one RB (i.e., 3 REs for k from 0 to 11, 3 REs for k from 12 to 23, 3 REs), it may be seen that this is the same pattern in the frequency axis as the serving cell tracking reference signal (TRS) (i.e., CSI-RS for tracking) that may be the reference RS of QCL type A. FIG. 11 below shows an example of a TRS pattern.

FIG. 11 illustrates a pattern of a tracking reference signal according to an embodiment of the present disclosure.

Based on the above, when the reference RS is configured to the CSI-RS for mobility of the non-serving cell in the QCL information within the serving cell as in Example #A4-1, the density of the corresponding CSI-RS is density 3 or more may be assumed. Alternatively, it may be assumed that only CSI-RS for mobility of density 3 or more may be utilized/configured/applied in the proposal of embodiment #A4-1 described above. And, based on the CSI-RS for mobility of density 3 or more, the CSI-RS may be configured as a reference RS for QCL type C/QCL type D.

Alternatively, a new type of QCL type may be defined in order to configure/utilize a CSI-RS for mobility whose density is configured to density 1 as a reference RS in QCL information within a serving cell.

Alternatively, the CSI-RS for mobility may be limitedly configured/utilized/applied only as a reference RS of QCL type D as a reference RS in QCL information within a serving cell. In this case, for reference RS corresponding to the QCL type A/B/C, a specific SSB having the same PCI as the CSI-RS for mobility configured as the QCL type D reference RS may be applied.

On the other hand, when the reference RS is configured as a CSI-RS for mobility of a non-serving cell in QCL information within a serving cell in addition to the above-described proposed method, a "changed CSI-RS pattern" that may be assumed to be actually transmitted based on the frequency/time resource information of the corresponding CSI-RS may be configured/indicated to the terminal. That is, when the reference RS in the QCL information in the serving cell is configured as the CSI-RS for mobility of the non-serving cell, the terminal may assume the "actual CSI-RS pattern" applied as the reference RS of the QCL information based on the proposed method below.

Option 1: Method of Defining "Modified CSI-RS Pattern" in the Frequency Domain

Figure 12:
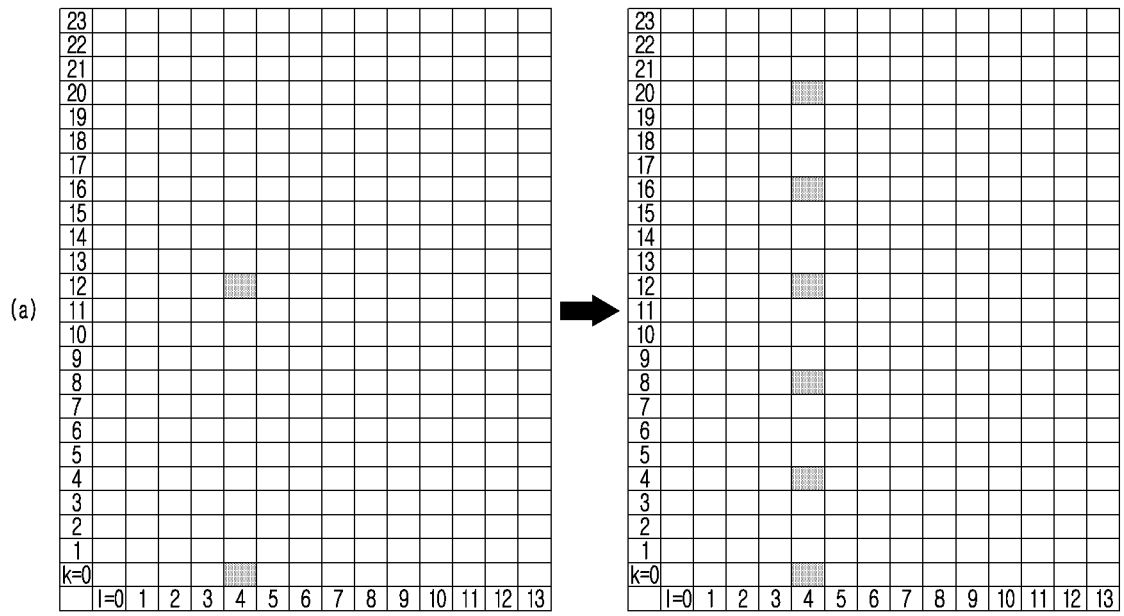
FIG. 12 illustrates a changed mobility CSI-RS pattern in the frequency domain according to an embodiment of the present disclosure.
Figure 12:
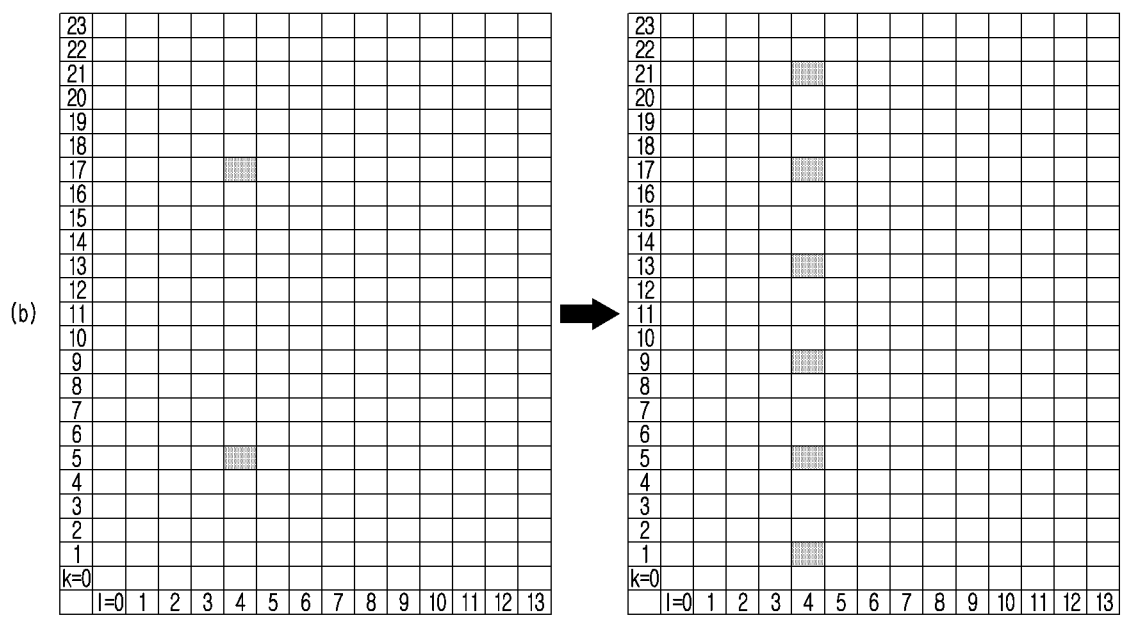

As described above, a pattern in the frequency domain of the CSI-RS for mobility may be defined based on csi-rs-MeasurementBW/density/frequencyDomainAllocation/subcarrierSpacing within the CSI-RS-ResourceConfigMobility IE. Here, in the case where density is set to density 1, if the CSI-RS corresponding to density 1 is configured/indicated as a reference RS in QCL information within the serving cell, the terminal may assume that density is set to 3. And, when a specific RE is selected/determined among the 12 REs in one RB through the value in frequencyDomainAllocation (i.e., the value of the row1/row2 parameters), the terminal may assume that the location of the corresponding RE is repeated in a specific RE unit (e.g., every 4 RE units) within one RB. FIG. 12 below shows an example of the proposed method.

FIG. 12 illustrates a changed mobility CSI-RS pattern in the frequency domain according to an embodiment of the present disclosure.

FIG. 12(a) illustrates a case where a first RE among 12 REs is selected/determined as a mobility CSI-RS. When three sub-RBs are defined in units of 12 REs by 4 REs, the first RE among the 12 REs is the same as the first RE of the first sub-RB. Therefore, the terminal may assume that this pattern is repeated for three sub-RBs within one RB.

FIG. 12(b) illustrates a case where the sixth RE among 12 REs is selected/determined as a mobility CSI-RS. When 12 REs are defined as 3 sub-RBs in units of 4 REs, the 6th RE among 12 REs is the same as the 2nd RE of the 2nd sub-RB, and the terminal may assume that this pattern is repeated for three sub-RBs within one RB.

Although FIG. 12 illustrates a case in which REs of a mobility CSI-RS are repeated in units of 4 REs, this is only one example and may be repeated in units of other REs.

When a plurality of samples may be secured in the frequency domain as in the above proposal, when used as a reference RS of QCL information, the channel characteristics required by the terminal (e.g., average delay, Doppler shift, delay spread, Doppler spread, spatial Rx parameter, etc.) may be guaranteed by the base station. Therefore, when a CSI-RS for mobility of a non-serving cell set to density 1 is configured as a reference RS of QCL information of a serving cell, it may be assumed that the terminal is configured to a specific pattern. Accordingly, the base station actually transmits the pattern assumed by the terminal, so that the terminal may obtain channel characteristics corresponding to the corresponding QCL type.

As an example of applying the above proposal, a CSI-RS for mobility corresponding to density 1 of a non-serving cell is configured as a reference RS of QCL information of a serving cell, and the QCL type is Type A and/or Type B and/or only when it is configured to Type C (i.e., at least one or more of Type A, B and/or C of QCL type), it may be defined to operate according to the above proposed method.

Option 2: Method of Defining a CSI-RS Pattern Changed to the Time Domain

As described above, a time domain pattern may be defined based on slotConfig/firstOFDMSymbolInTimeDomain within the CSI-RS-ResourceConfigMobility IE. Here, in order to provide more samples in the time domain, the following proposed method may be applied.

Option 2-1: Assuming that the symbol position indicated/configured by firstOFDMSymbolInTimeDomain is symbol s, the terminal may assume that the RS of the same pattern is transmitted in the frequency axis in a specific symbol position (e.g., symbol s+4 and/or if the symbol s+4 exceeds the slot boundary, symbol s−4).

Option 2-2: Assuming that the slot position within a specific period indicated/configured by slotConfig is n, the terminal may assume that the RS of the same pattern as the RS transmitted in slot n is transmitted in slot n+1 (or n−1).

Option 2-1/2-2 above may be applied alone or may be applied in a mixed form (together).

In addition, option 2 (option 2-1/2-2) may be applied alone or may be applied in a mixed form (together) with option 1.

A separate setting value/indicator for setting/applying option 2 (option 2-1/2-2) and/or option 1 may be defined. That is, a configuration value/indicator indicating that the changed CSI-RS pattern is applied is defined, and the base station may transmit it to the terminal through higher layer signaling or dynamic signaling. In addition, at least one of option 2 (option 2-1/2-2) and/or option 1 may be set/applied based on the setting value/indicator.

Figure 13:
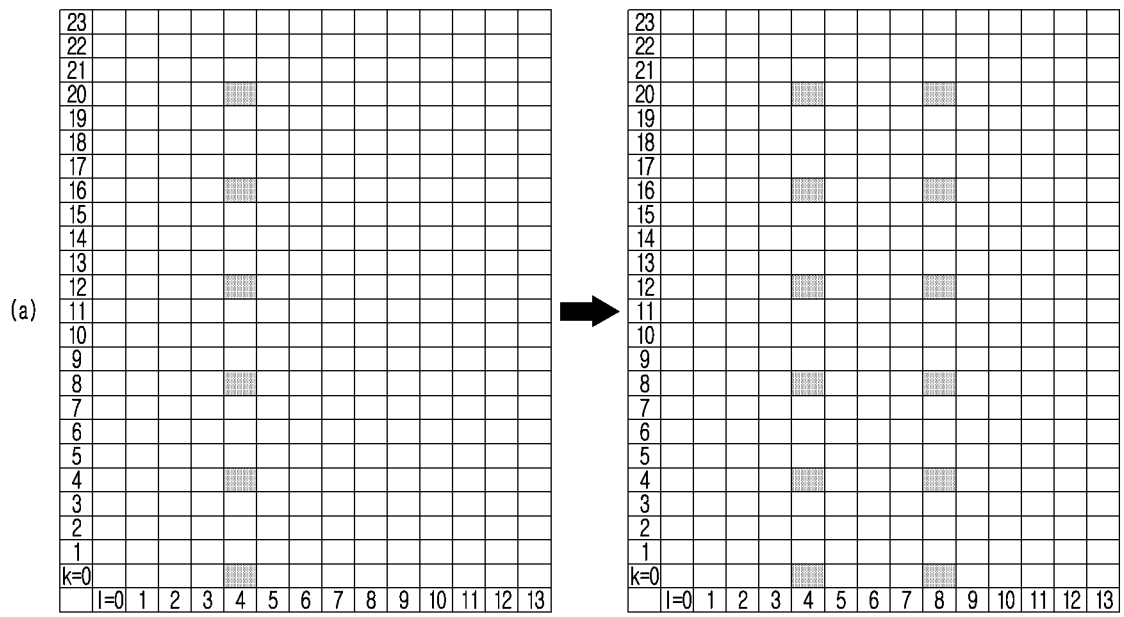
FIG. 13 illustrates a changed mobility CSI-RS pattern in the time domain according to an embodiment of the present disclosure.
Figure 13:
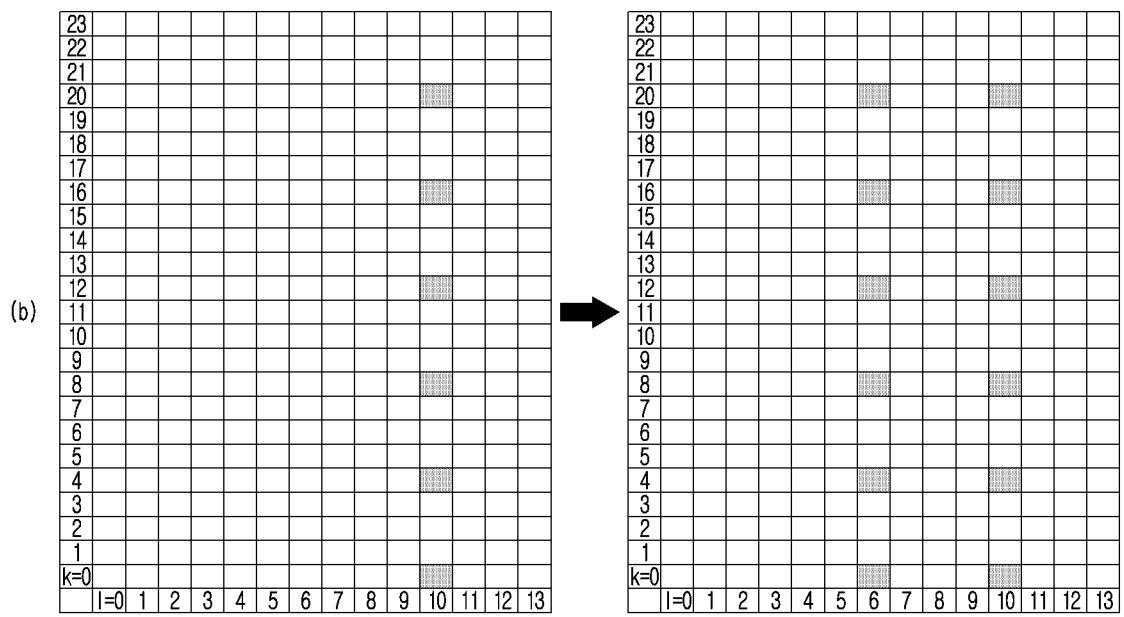

FIG. 13 illustrates a mobility CSI-RS pattern changed in the time domain according to an embodiment of the present disclosure.

FIG. 13 illustrates the method of option 2-1 described above.

FIG. 13(a) illustrates a case in which OFDM symbol 4 among 14 OFDM symbols (i.e., symbols in which 1 is 0 to 13) is configured as a mobility CSI-RS. According to the above-described option 2-1, the terminal may assume that the CSI-RS of the same pattern as the CSI-RS of OFDM symbol 4 is transmitted in OFDM symbol 4+4=8.

FIG. 13(b) shows an example in which OFDM symbol 10 among 14 OFDM symbols (i.e., symbols in which 1 is 0 to 13) is configured. According to the proposed method of option 2-1 described above, since 10+4=14 exceeds the slot range, the terminal may assume that the CSI-RS of the same pattern as the CSI-RS of OFDM symbol 10 is transmitted in OFDM symbol 10−4=6.

Figure 14:
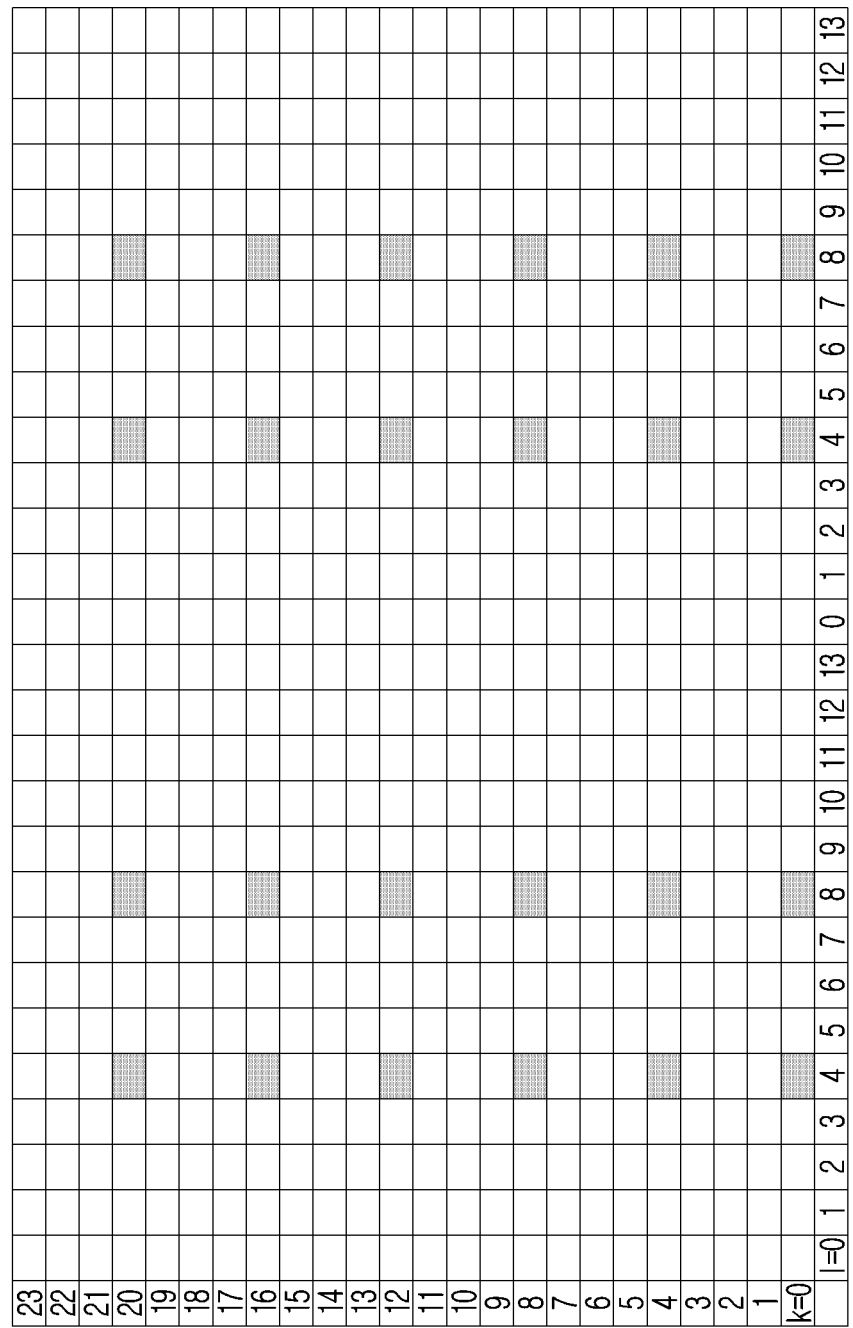
FIG. 14 illustrates a changed mobility CSI-RS pattern in the time domain according to an embodiment of the present disclosure.

FIG. 14 illustrates a mobility CSI-RS pattern changed in the time domain according to an embodiment of the present disclosure.

A case in which the proposed method of option 2-2 described above in the example of FIG. 13 (a) is applied together is illustrated.

As shown in FIG. 13, the terminal may assume that the CSI-RS of the same pattern is transmitted in two contiguous (consecutive) slots.

Based on the above proposed method (option 2 (option 2-1/2-2)/option 1), ultimately, it may have a feature that the pattern of CSI-RS for mobility of non-serving cells may be the same as the pattern of TRS that can be set in serving cells. This may be a method for indirectly notifying TRS (i.e., CSI-RS for tracking) from a non-serving cell. Therefore, by securing sufficient samples in the frequency domain and/or time domain based on the above proposal, even when the CSI-RS for mobility of a non-serving cell is used as a reference RS for serving cell QCL information, the base station may ensure that the terminal acquires necessary channel characteristics (e.g., average delay, delay spread, Doppler shift, Doppler spread, spatial Rx parameter, etc.).

As an example of applying the above proposal (e.g., applying the proposed method of option 2-1/2-2 or applying the proposed method of option 2-1/2-2 and option 1), only when the CSI-RS for mobility of the non-serving cell is configured as the reference RS of the QCL information of the serving cell, and the QCL type is configured to Type A and/or Type B and/or Type C (i.e., at least one or more of Type A, B and/or C of the QCL type), it may be defined to operate according to the above proposed method. Here, the specific operation and CSI-RS pattern may be determined according to whether option 1/option 2-1/option 2-2 is operated and related parameters described in the above proposed method.

Embodiment #A4-2: in order to configure CSI-RS information for mobility of a non-serving cell in QCL information, the base station may configure/indicate the terminal of serving cell information (e.g., serving cell index)/physical cell ID (PCI)/SSB index, etc.

As described in Example #A1-2 above, each serving cell may be mapped with a specific MO. That is, a specific serving cell may have a corresponding relation with a specific MO through the field (parameter) (i.e., serving-CellMO) value for the serving cell measurement target within the IE for setting the serving cell (i.e., ServingCell-Config IE).

Therefore, by configuring a specific serving cell index in the QCL information to the terminal by the base station, the terminal may utilize the MO information connected to the corresponding serving cell. If the terminal may utilize specific MO information, the method of using the MO information described in the above-described embodiment #A4-1 may be applied as it is in this case.

On the other hand, in the QCL information (i.e., QCL-Info) in the IE (i.e., TCI-State IE) for the TCI state previously exemplified in Table 6, a field (parameter) for a cell that may already point to a specific serving cell (i.e., cell) (eg, indicating a serving cell index (ServCellIndex)) is defined. Therefore, in a specific case (e.g., when the base station configured/indicates a separate indicator/parameter) by extending the function of the existing parameter to apply the above-described proposed method, the field (parameter)

for the cell (i.e., cell) may function as an indication of the MO connected to the serving cell. Meanwhile, in this case, the terminal may assume that specific parameter(s) (e.g., BWP identifier (bwp-Id)) among existing parameters in QCL information (QCL-Info) is not configured/applied.

What is named 'QCL information' in the above-described proposal of the present disclosure may include DL QCL information and spatial relation information/pathloss reference RS information for UL signal/resource/channel. The spatial relation information of UL may refer to information configured to the terminal by the base station to inform the terminal of a spatial domain transmission filter to be assumed when the terminal transmits a UL signal/resource channel. For example, higher layer parameters such as PUCCH spatial relationship information (i.e., PUCCH-SpatialRelationInfo) and SRS spatial relationship information (i.e., SRS-SpatialRelationInfo) defined in the current standard may correspond to this. For example, PUCCH spatial relationship information (i.e., PUCCH-SpatialRelationInfo) is a parameter used to configure spatial domain configuring for PUCCH transmission, serving cell ID/reference signal (e.g., For example, SSB/CSI-RS/SRS) related index/ID, etc. may be included. For example, SRS spatial relationship information (i.e., SRS-SpatialRelationInfo) is used to establish a spatial relation between a reference RS and a target SRS, and serves as a serving cell ID/reference signal. signal) (e.g., SSB/CSI-RS/SRS) related index/ID. The UL pathloss reference RS information may refer to information configured to the terminal by the base station to inform the terminal of a pathloss reference RS to be assumed for power control when the terminal transmits a UL signal/resource/channel. For example, higher layer parameters such as PUCCH pathloss reference RS (i.e., PUCCH-PathlossReferenceRS) and pathloss reference RS configuration (i.e., PathlossReferenceRS-Config) defined in the current standard may correspond to this. An index/ID of a reference signal (e.g., SSB/CSI-RS, etc.) serving as a PUCCH/SRS pathloss reference may be indicated through the pathloss reference RS-related parameter.

Proposal #2: Method for Configuring Resources for CSI Measurement/Acquisition/Reporting to Non-Serving Cell Resources In the current standard, based on the serving cell's SSB/CSI-RS, the terminal may be supported to measure/report CSI such as L1-RSRP (reference signal received power)/L1-SINR (signal to interference ratio) (e.g., 'cri-RSRP', 'cri-SINR', 'ssb-Index-RSRP', 'ssb-Index-SINR' within the field/parameter (reportQuantity) for the report quantity within IE for CSI reporting configuration (CSI-ReportConfig IE)).

Here, Here, in order to obtain the above-mentioned advantages, for L3 measurement (i.e., RRM measurement), SSB transmitted from serving cell and/or non-serving cell and CSI-RS for mobility may be used/configured/indicated as a resource for L1 measurement (e.g., for L1-RSRP/L1-SINR). In this case, since the resources of the neighboring cell may be considered in the CSI measurement/acquisition/reporting process in the L1/L2 phase, the terminal may examine more candidate resources, and report resources more suitable for control data transmission/data transmission to the base station. In addition, since the above operation may be performed in the L1/L2 phase, the existing L3 measurement (e.g., RRM measurement, etc.) and handover procedure may not be performed, so the time required for the terminal to use the resources of the neighboring cell may be greatly shortened, and the terminal may use the resources of the neighboring cell more dynamically. In addition, since the resource transmitted by the neighbor cell is used as it is for L3 measurement and additional resources for the proposed method may not be defined, it may have the advantage of being able to efficiently use the resources of serving cells and non-serving cells.

On the other hand, it may be seen that the above proposal #2 has the following differences when compared to proposal #1. In the case of proposal #1, a method of using/configuring non-serving cell resources (eg, SSB/mobility CSI-RS) as a reference RS for serving cell QCL information will be proposed. This may be used for the base station to inform the terminal that the channel characteristics (e.g., Doppler shift, Doppler spread, average delay, delay spread, spatial Rx parameter, etc.) related to the QCL information measured by the terminal based on the non-serving cell resource may be applied to a specific resource of the serving cell. On the other hand, in the case of proposal #2, the terminal may perform L1 measurement (e.g., for L1-RSRP/L1-SINR, etc.) based on the resource (e.g., SSB/mobility CSI-RS) of the non-serving cell. And, it has a difference that the L1 measurement result may be reported to the base station based on the reporting procedure/configuration for the L1 measurement in the serving cell.

An example of an operation of a BS/UE based on proposals #1 and #2 above may be as follows. Based on proposal #2, a beam management procedure may be performed based on resources of serving cells and non-serving cells. The base station may transmit TRS (i.e., CSI-RS for tracking)/CSI-RS for CSI acquisition/DM-RS for PDCCH/PDSCH etc. with a "specific beam (direction)" based on the beam management result. At this time, based on proposal #1, the resource of the serving cell and/or non-serving cell, which means the "specific beam (direction)", may be configured as the QCL reference RS for the TRS/CSI-RS/DM-RS.

Figure 15:
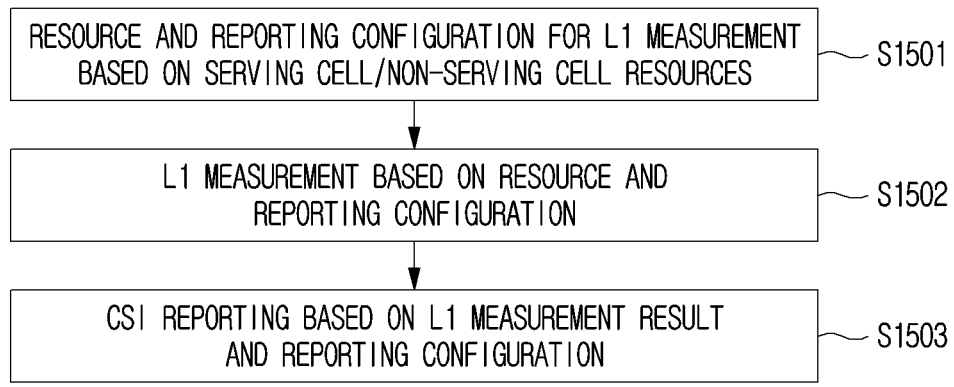
FIG. 15 illustrates a procedure for L1 measurement (e.g., for beam management) between a base station and a terminal according to an embodiment of the present disclosure.

FIG. 15 illustrates a procedure for L1 measurement (e.g., for beam management) between a base station and a terminal according to an embodiment of the present disclosure.

Referring to FIG. 15, the base station transmits resource reporting configuration for L1 measurement (e.g., L1-RSRP/L1-SINR, etc.) to the terminal based on serving cell/non-serving cell resources (S1501).

The terminal performs L1 measurement based on resource and report configuration (S1502).

The terminal transmits the CSI report based on the L1 measurement result and the report configuration to the base station (S1503).

Figure 16:
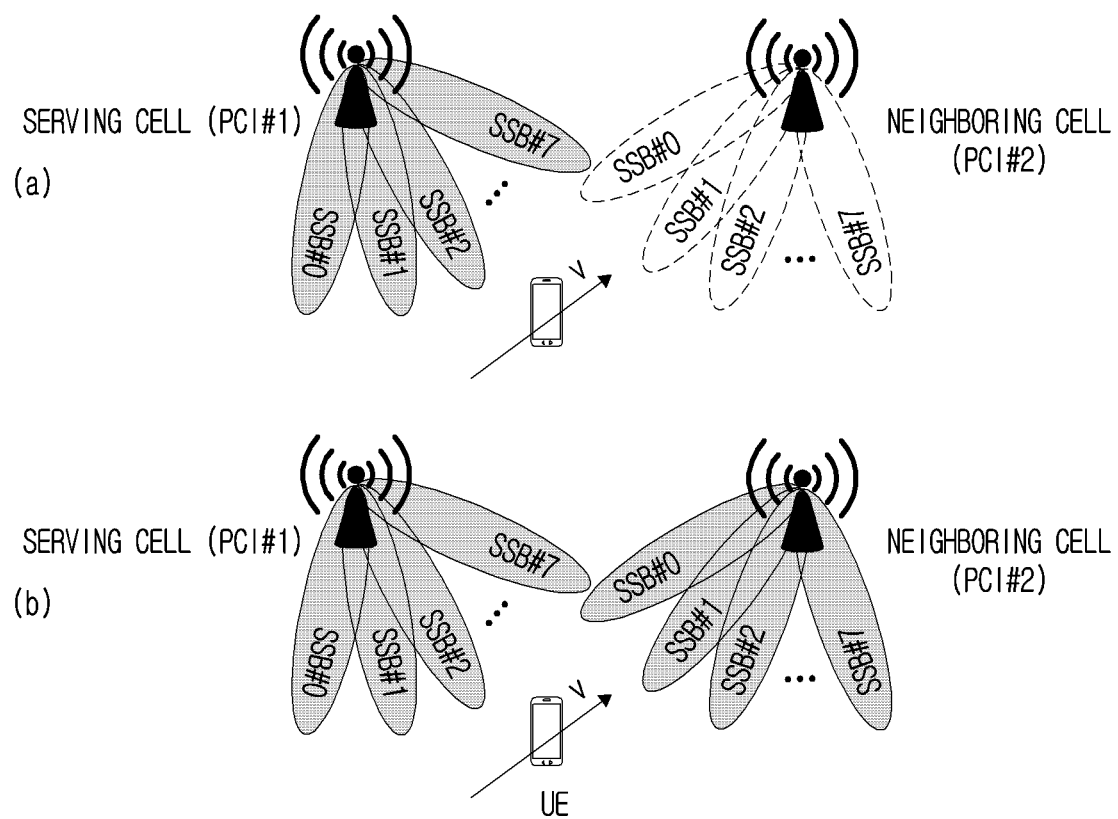
FIG. 16 illustrates a beam management method using resources of a non-serving cell according to an embodiment of the present disclosure.

FIG. 16 illustrates a beam management method using resources of a non-serving cell according to an embodiment of the present disclosure.

FIG. 16(*a*) illustrates a conventional method of performing beam management considering only serving cell resources.

Referring to FIGS. 15 and 16 (*a*) above, the base station transmits a resource configuration configured with SSB #0, SSB #1, . . . , SSB #7 on a serving cell (PCI #1) and a reporting configuration configured with L1-RSRP to the terminal (S1501). The terminal measures the L1-RSRP value(s) for each SSB in the resource configuration (S1502). The terminal reports the SSB index and the related L1-RSRP value to the base station (S1503).

In FIG. 16(*a*), the process of FIG. 15 may be performed based on a specific resource/report configuration and may be performed based on a resource of a serving cell (e.g., SSB).

In FIG. 16 (*a*), no procedure/operation is performed between the base station and the terminal for non-serving cell (i.e., neighbor cell) PCI #2.

FIG. 16(b) illustrates a method according to an embodiment of the present disclosure in which beam management is performed in consideration of non-serving cell resources as well as serving cell resources.

Referring to FIGS. 15 and 16 (b) above, the base station transmits i) a resource configuration configured with SSB #0, SSB #1, . . . , SSB #7 on a serving cell (PCI #1) and a reporting configuration configured with L1-RSRP and ii) a resource configuration configured with SSB #0, SSB #1, . . . , SSB #7 on a neighboring cell (PCI #2) and a reporting configuration configured with L1-RSRP to the terminal, and ii) (S1501). The terminal measures the L1-RSRP value(s) for each SSB in the resource configuration (S1502). The terminal reports the SSB index and the related L1-RSRP value to the base station (S1503).

On the other hand, in FIG. 16(b), the process of FIG. 15 shows a certain specific resource setting (e.g., resource setting #1) based on the resource of the serving cell (e.g., SSB) and a non-serving cell Based on another specific resource configuration (e.g., resource configuration #2) based on a resource (eg, SSB), according to a reporting configuration connected to each resource configuration, the terminal may report CSI information measured based on each resource configuration to the base station based on each report configuration. Here, each report configuration may be the same or different.

In the above example, it is assumed that the serving cell resource and the non-serving cell resource correspond to different resource configurations, but they may all be configured within the same resource configuration. For example, configuration(s) for both serving cell resources and non-serving cell resources within a specific resource configuration may be included. In addition, single CSI information may be reported to the base station according to the reporting configuration linked to the resource configuration.

On the other hand, in the example of FIG. 16 (a), in order for the base station to transmit data to the terminal through a resource corresponding to PCI #2, relatively many steps, such as 1) performing L3 measurement (i.e., RRM measurement) and report by the terminal, 2) performing by the terminal and the base station a handover procedure from PCI #1 to PCI #2 based on the above L3 measurement and report values, 3) performing by the terminal L1 measurement within the changed serving cell (i.e., PCI #2) 4) performing by the base station scheduling data based on the L1 measurement and reporting values are required. On the other hand, in the example of FIG. 16 (b), 1) performing by the terminal L1 measurement in consideration of serving cell resources and non-serving cell resources, 2) Data scheduling by the base station based on the L1 measurement and reporting values may be greatly simplified in comparison to the procedure in FIG. 16 (a), which is an existing method.

Meanwhile, as in the above-described example, when a base station/terminal determines a specific beam through an L1 measurement and reporting procedure, a procedure for data transmission/reception may be performed by utilizing a QCL relation with the specific beam, and at this time, a method below the above suggestion #1 may be applied. For example, in the example of FIG. 16(b), when the base station schedules to transmit data to the terminal through SSB #1 of PCI #2, the base station may configure TRS with SSB #1 of PCI #2 set as reference RS for QCL type C (and QCL type D) to the terminal. In addition, the base station may configure the CSI-RS for CSI acquisition to the terminal in which the TRS is set as a reference RS for QCL type A (and QCL type D). And, the base station may obtain channel information (e.g., RI/PMI/CQI, etc.) of the terminal for data scheduling based on the CSI-RS. In addition, the base station and the terminal may transmit and receive PDCCH/PDSCH by configuring the TRS or CSI-RS for CSI acquisition as a reference RS for QCL type A (and QCL type D).

According to proposal #2, resources for measuring/acquiring/reporting CSI in a serving cell may be configured as resources of a non-serving cell. To this end, the following non-serving cell resource information (e.g., SSB information/CSI-RS information for mobility, etc.) may be configured/used. In other words, SSB resources of non-serving cells and/or CSI-RS resources for mobility of non-serving cells/serving cells may be configured/used as resources for CSI measurement/acquisition/reporting of the terminal.

Embodiment #B1: Method for Configuring/Using SSB Information of Non-Serving Cell In order to configure the SSB of the non-serving cell as a resource for CSI measurement/acquisition/report in the serving cell, the base station shall configure resource information of the non-serving cell SSB. For this, the method #A1-1/#A1-2/#A1-3 in the above proposal #1 may be applied. That is, the base station may configure the resource region information of the non-serving cell SSB to the terminal based on the #A1-1/#A1-2/#A1-3 method, and a specific one of the non-serving cell SSBs described above SSB may be configured as a resource for measuring/acquiring/reporting CSI within a serving cell.

Table 14 illustrates an IE for configuring resources for CSI measurement/acquisition/reporting (i.e., CSI-ResourceConfig IE).

TABLE 14

```
-- ASN1START
-- TAG-CSI-RESOURCECONFIG-START
CSI-ResourceConfig ::=                  SEQUENCE {
    csi-ResourceConfigId                CSI-ResourceConfigId,
    csi-RS-ResourceSetList              CHOICE {
        nzp-CSI-RS-SSB                      SEQUENCE {
            nzp-CSI-RS-ResourceSetList          SEQUENCE (SIZE (1..maxNrofNZP-CSI-
RS-ResourceSetsPerConfig)) OF NZP-CSI-RS-ResourceSetId
OPTIONAL, -- Need R
            csi-SSB-ResourceSetList             SEQUENCE (SIZE (1..maxNrofCSI-SSB-
ResourceSetsPerConfig)) OF CSI-SSB-ResourceSetId
OPTIONAL -- Need R
        },
        csi-IM-ResourceSetList              SEQUENCE ( SIZE (1..maxNrofCSI-IM-
ResourceSetsPerConfig)) OF CSI-IM-ResourceSetId
    },
    bwp-Id                              BWP-Id,
```

TABLE 14-continued

```
resourceType                    ENUMERATED { aperiodic, semiPersistent,
periodic },
    ...
}
-- TAG-CSI-RESOURCECONFIG-STOP
-- ASN1STOP
```

Table 15 illustrates a higher layer IE for an SSB resource set for CSI measurement (i.e., CSI-SSB-ResourceSet IE).

The higher layer IE for the SSB resource set for CSI measurement (i.e., the CSI-SSB-ResourceSet IE) is used for configuring one SS/PBCH block resource set referring to the SS/PBCH indicated in the higher layer IE for the serving cell common configuration (i.e., the ServingCellConfigCommon IE).

TABLE 15

```
-- ASN1START
-- TAG-CSI-SSB-RESOURCESET-START
CSI-SSB-ResourceSet ::=        SEQUENCE {
    csi-SSB-ResourceSetId         CSI-SSB-ResourceSetId,
    csi-SSB-ResourceList          SEQUENCE
    (SIZE(1..maxNrofCSI-SSB-ResourcePerSet)) OF SSB-Index,
    ...
}
-- TAG-CSI-SSB-RESOURCESET-STOP
-- ASN1STOP
```

Referring to Table 14, a specific SSB resource within the serving cell may be configured as a resource for CSI measurement/acquisition/reporting to the terminal, through the higher layer IE for the SSB resource set for CSI measurement of Table 15 (i.e., CSI-SSB-ResourceSet IE) within IE for configuring resource(s) for CSI measurement/acquisition/reporting (i.e., CSI-ResourceConfig IE).

At this time, based on the above proposed method, the SSB configured in the configuration value for the resource(s) target to CSI measurement/reporting (e.g., CSI-ResourceConfig of Table 14) may configured as the non-serving cell SSB.

Here, similar to Example #A1-1 above, in order to configure the SSB information of the non-serving cell, the base station may configure/indicate measurement object (MO) information (eg, MO ID)/physical cell ID (PCI)/SSB index, etc. to the terminal. Here, the PCI may be one of the PCIs included in the MO ID, and the SSB index may indicate one of the SSBs corresponding to the PCI included in the MO ID.

Also, similar to Example #A1-2 above, in order to configure SSB information of the non-serving cell, the base station may configure/indicate serving cell information (eg, serving cell index)/physical cell ID (PCI)/SSB index or the like to the terminal. Here, the serving cell may refer to a serving cell connected to MO information including SSB information of the non-serving cell.

Also, similar to the above embodiment #A1-3, the base station may configure/indicate the SSB information of the non-serving cell, the time/frequency resource information of the non-serving cell SSB/PCI (Physical Cell ID)/SSB index or the like to the terminal.

Table 16 below shows an example to which the above-described proposed method may be applied.

Table 16 illustrates a higher layer IE (ie, CSI-SSB-ResourceSet IE) for an SSB resource set for CSI measurement according to an embodiment of the present disclosure.

TABLE 16

```
-- ASN1START
-- TAG-CSI-SSB-RESOURCESET-START
CSI-SSB-ResourceSet ::=        SEQUENCE {
    csi-SSB-ResourceSetId         CSI-SSB-ResourceSetId,
    csi-SSB-ResourceList          SEQUENCE
    (SIZE(1..maxNrofCSI-SSB-ResourcePerSet)) OF SSB-Index,
    related-measObjectId          MeasObjectId,
    related-physCellId            PhysCellId,
    ...
}
-- TAG-CSI-SSB-RESOURCESET-STOP
-- ASN1STOP
```

Referring to Table 16, the SSB resource corresponding to the SSB index included in the CSI-SSB-ResourceSet is a field/parameter (i.e., related-measObjectId), and an SSB resource corresponding to a field/parameter for related PCI (i.e., related-physCellId). FIG. 15 corresponds to an example for helping understanding among methods for applying the proposed method, and is not limited to the only method applicable to the proposed method. Accordingly, it is obvious that other examples to which the above proposed method may be applied can also be considered. For example, in FIG. 15, it is assumed that the existing CSI-SSB-ResourceSet IE is extended, but it may also be considered that a new IE for a new operation is introduced.

In the above example, it is assumed that the SSBs configured in the CSI-SSB-ResourceSet have the same PCI, but SSBs corresponding to different PCIs may be configured as one set (e.g., CSI-SSB-ResourceSet). In this case, there is an advantage that CSI measurement and reporting may be performed based on a single report for SSBs corresponding to different PCIs.

Embodiment #B2: Method for Configuring/Using CSI-RS Information for Mobility (i.e., for RRM Measurement) of a Non-Serving Cell In order to configure the CSI-RS for mobility of non-serving cell/serving cell as a resource for measuring/acquiring/reporting CSI in the serving cell, the base station shall configure the mobility CSI-RS resource information of the non-serving cell/serving cell. For this, methods #A4-1/#A4-2 in Proposal #1 above may be applied. That is, the base station may configure the resource region information of the non-serving cell/serving cell mobility CSI-RS to the terminal based on the #A4-1/#A4-2 method, and configure a specific CSI-RS among the non-serving cell/serving cell mobility CSI-RSs as a resource for measuring/acquiring/reporting CSI within a serving cell.

Here, similar to #A4-1 above, in order to configure CSI-RS information for mobility of a non-serving cell, the base station may configure/indicate measurement object (MO) information (e.g., MO ID)/physical cell ID (PCI)/CSI-RS index, and the like to the terminal. Here, the PCI may be one of the PCIs included in the MO ID, and the CSI-RS index may indicate one of the CSI-RSs corresponding to the PCI included in the MO ID.

In addition, similar to the previous embodiment #A4-2, in order to configure CSI-RS information for mobility of a non-serving cell, the base station may configure/indicate serving cell information (e.g., serving cell index)/physical cell ID (PCI)/CSI-RS index, and the like to the terminal. Here, the serving cell may refer to a serving cell linked to MO information including CSI-RS information for mobility of the non-serving cell.

As seen in the description of the IE for configuring resources for CSI measurement/acquisition/reporting (i.e., CSI-ResourceConfig IE) in embodiment #B1 above, specific SSB resources and/or NZP CSI-RS resources within the serving cell may be configured as resources for CSI measurement/acquisition/reporting to the terminal, through higher layer IE for the NZP CSI-RS resource set (i.e., CSI-SSB-ResourceSet IE) and/or higher layer IE for the SSB resource set (i.e., NZP-CSI-RS-ResourceSet) for CSI measurement. Here, based on the above proposed method, a setting value for a resource target to CSI measurement/reporting (e.g., CSI-ResourceConfig) may be configured to a non-serving cell/serving cell mobility CSI-RS. Table 17 below shows an example to which the proposed method can be applied.

Table 17 illustrates a higher layer IE for configuring a CSI-RS resource set for mobility (eg, Mobility-CSI-RS-ResourceSet IE) according to an embodiment of the present disclosure.

TABLE 17

```
-- ASN1START
-- TAG-Mobility-CSI-RS-RESOURCESET-START
Mobility-CSI-RS-ResourceSet ::=    SEQUENCE {
    mobility-CSI-ResourceSetId       Mobility-CSI-RS-ResourceSetId,
    related-measObjectId             MeasObjectId,
    related-physCellId               PhysCellId,
    mobility-CSI-RS-Resources        SEQUENCE (SIZE
(1..maxNrofX)) OF CSI-RS-Index,
    repetition                       ENUMERATED { on,
                                     off }
OPTIONAL,   -- Need S
    aperiodicTriggeringOffset        INTEGER (0..6)
OPTIONAL,   -- Need S
...,
}
-- TAG-Mobility-CSI-RS-RESOURCESET-STOP
-- ASN1STOP
```

Referring to Table 17, a mobility CSI-RS resource corresponding to a CSI-RS index included in a higher layer IE (e.g., Mobility-CSI-RS-ResourceSet IE) for configuring a CSI-RS resource set for mobility may mean a mobility CSI-RS resource corresponding to a field/parameter for a related measurement object identifier (i.e., MO ID) (i.e., related-measObjectId), a field/parameter for a related PCI (i.e., related-physCellId). The above example may be an example for helping understanding among methods for applying the proposed method, and is not limited to the only method applicable to the proposed method. Accordingly, it is obvious that other examples to which the above proposed method may be applied may also be considered.

Meanwhile, in the above example, it is assumed that the mobility CSI-RSs configured in the Mobility-CSI-RS-ResourceSet have the same PCI, but one set of mobility CSI-RSs corresponding to different PCIs (e.g., Mobility-CSI-RS-ResourceSet) may be configured. In this case, it is possible to have the advantage of performing CSI measurement and reporting based on a single report for mobility CSI-RSs corresponding to different PCIs.

Table 18 illustrates a higher layer IE for NZP CSI-RS resources (i.e., NZP-CSI-RS-Resource IE).

A higher layer IE for NZP CSI-RS resources (i.e., NZP-CSI-RS-Resource IE) may be configured to be measured by the terminal and is used for configuring a NZP CSI-RS transmitted within a cell including this IE.

TABLE 18

```
-- ASN1START
-- TAG-NZP-CSI-RS-RESOURCE-START
NZP-CSI-RS-Resource ::=     SEQUENCE {
    nzp-CSI-RS-ResourceId       NZP-CSI-RS-ResourceId,
    resourceMapping             CSI-RS-ResourceMapping,
    powerControlOffset          INTEGER (-8..15),
    powerControlOffsetSS        ENUMERATED {db-3, db0, db3,
                                db6}
OPTIONAL,   -- Need R
    scramblingID                ScramblingId,
    periodicityAndoffset        CSI-ResourcePeriodicityAndOffset
OPTIONAL,   -- Cond PeriodicOrSemiPersistent
    qcl-InfoPeriodicCSI-RS      TCI-StateId
OPTIONAL,   -- Cond Periodic
    ...
}
-- TAG-NZP-CSI-RS-RESOURCE-STOP
-- ASN1STOP
```

Referring to Table 18, a field (parameter) for power control offset (i.e., powerControlOffset) indicates the power offset of the PDSCH RE relative to the NZP CSI-RS RE power in dB units. A field (parameter) for the power control offset for a synchronization signal (SS) (i.e., powerControlOffsetSS) indicates the NZP CSI-RS RE power offset relative to a secondary synchronization signal (SSS) RE power in dB units.

As shown in Table 18, the terminal may receive configuration for the field (parameter) value for the power control offset (i.e., powerControlOffset) and the field (parameter) value for the power control offset for the synchronization signal (SS) (i.e., powerControlOffsetSS) for a specific NZP CSI-RS resource, via a higher layer signaling (e.g., RRC signaling). Through this, the terminal may derive the power of the NZP CSI-RS based on the powerControlOffsetSS value based on the SSB power of the serving cell that may be configured by the SS/PBCH block power (i.e., ss-PBCH-BlockPower). In addition, the power of the PDSCH may be derived based on the powerControlOffset value based on the power of the NZP CSI-RS derived through the above process.

However, for the mobility CSI-RS of a non-serving cell/serving cell, a value capable of deriving power is not given as described above. Therefore, the base station may configure/indicate power information (e.g., average EPRE of resource elements (REs)) for mobility CSI-RS of non-serving cell/serving cell and/or information capable of deriving power for mobility CSI-RS to the terminal. In addition, it is also possible to derive power information of a PDSCH connected to the mobility CSI-RS based on the power information (e.g., configure/indicate a power offset value between the mobility CSI-RS and the PDSCH). The following embodiment shows examples of methods for applying the above proposed method. The following embodiments are not intended to limit the method for applying the proposed method, but may be an example for supporting the proposed method. Therefore, other methods to which the above proposed method may be applied may also be considered.

Option 1: For each mobility CSI-RS resource of a non-serving cell/serving cell, the power information of each resource (e.g., average EPRE of resource elements (RE))

may be configured/indicated explicitly (e.g., average EPRE in dBm units of resource elements (REs) carrying mobility CSI-RS).

Option 1-1: For option 1, the same/one power information may be configured/indicated for a mobility CSI-RS resource corresponding to the same PCI and/or the same MO ID.

Option 2: power information on the mobility CSI-RS resource of the non-serving cell/serving cell may configured/indicated in the form of an offset value based on the power information on the SSB of the non-serving cell/ serving cell. For example, in the current standard, only power information for the serving cell SSB (i.e., ss-PBCH-BlockPower) is configured, but the base station may configure/indicate SSB power information corresponding to each PCI to the terminal for SSBs corresponding to different PCIs. After that, the base station may configure/indicate an offset value based on SSB power information corresponding to the same PCI for the mobility CSI-RS resource.

Embodiment #B3: Method for Configuring TRS (i.e., CSI-RS for Tracking) Information Based on CSI-RS Information for Mobility of Non-Serving Cell/Serving Cell (i.e., for RRM Measurement)

When configuring/indicating TRS resource information of a non-serving cell/serving cell to the terminal, by the base station configuring/indicating additionally necessary information to the terminal based on mobility CSI-RS resource information of the non-serving cell/serving cell, signaling overhead required for TRS configuration may be reduced.

For example, in the current standard, by configuring two or four independent NZP CSI-RS resources are configured as one NZP CSI-RS resource set, one resource set (i.e., parameters for TRS information (trs-Info) value "true") may be configured as one TRS. Accordingly, by configuring each NZP CSI-RS resource and configuring the NZP CSI-RS resource set based on the NZP CSI-RS resource set, it may be seen that the amount of information required for this is large.

On the other hand, since mobility CSI-RS already includes specific time/frequency resource domain information and period information, TRS may be configured based on this. For example, by the base station additionally configuring the RS location to be additionally transmitted for TRS transmission based on the mobility CSI-RS resource based on the offset value in the time/frequency domain, resource information required for TRS transmission may be configured to the terminal. For example, the offset value may mean an offset value indicating a symbol in which the frequency pattern of the mobility CSI-RS repeatedly appears based on the mobility CSI-RS symbol within one slot. And/or the offset value may mean an offset value indicating the first TRS symbol in a slot based on the mobility CSI-RS symbol (e.g., the second TRS symbol may be configured after a certain number of symbols (e.g., 4 symbols) relative to the first TRS symbol, and may be configured before a certain number of symbols if it exceeds the slot boundary). Alternatively, if the above offset value is not separately configured, CSI-RS(s) having the same frequency pattern may be transmitted after a certain number of symbols (e.g., 4 symbols) based on the mobility CSI-RS symbol and the mobility CSI-RS symbol or before a certain number of symbols (e.g., 4 symbols) if it exceeds the slot boundary. When a TRS pattern within one slot is set based on the above method, the number of slots to which the pattern is applied may also be configured for the terminal. Alternatively, RS patterns for contiguous different slots may be configured based on the above offset method (e.g., configuring/indicating a plurality of offset values for each RS symbol). In addition, when a TRS pattern corresponding to one slot or two slots is defined based on the above method, a period value for the corresponding TRS pattern may also be separately configured/indicated.

Summarizing the above proposal, in order to define a resource set corresponding to a specific TRS, the base station may configure/indicate a specific mobility CSI-RS and an offset value (e.g., specific number of symbols) based on the mobility CSI-RS to the terminal. At this time, resource region information of non-serving cell/serving cell mobility CSI-RS (e.g., a frequency/time resource domain) may be used.

Figure 17:
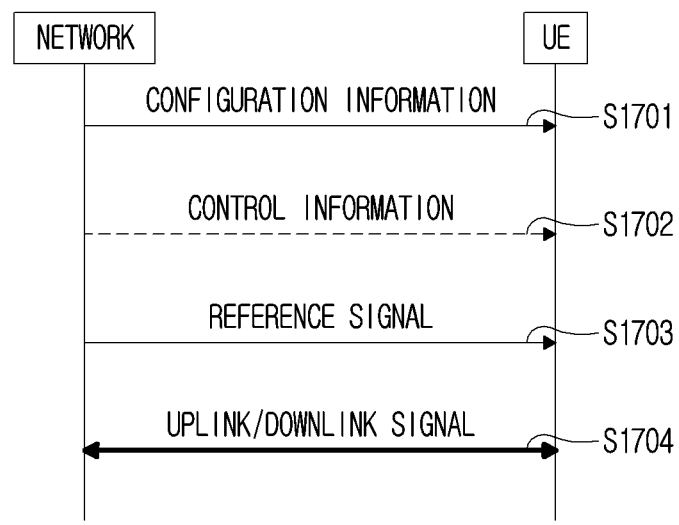
FIG. 17 is a diagram illustrating a signaling procedure between a network and a terminal for a method for transmitting and receiving an uplink/downlink signal according to an embodiment of the present disclosure.

FIG. 17 is a diagram illustrating a signaling procedure between a network and a UE for a method for transmitting and receiving an uplink/downlink signal according to an embodiment of the present disclosure.

FIG. 17 illustrates signaling between a network and a terminal based on the above-described proposed method (e.g., Proposal #1/Embodiment #A1/A #1-1/#A1-2/#A1-3/ Embodiment #A2/Embodiment #A3/Embodiment #A4/A #4-1/#A4-2/Proposal #2/Embodiment #B1/#B2/#B3, etc.). The example of FIG. 17 is for convenience of description and does not limit the scope of the present disclosure. Some step(s) illustrated in FIG. 17 may be omitted depending on circumstances and/or configurations. In addition, the network and the UE in FIG. 17 are only examples, and may be implemented with the device illustrated in FIG. 20 below. For example, the processor 102/202 of FIG. 20 may control to transmit/receive a channel/signal/data/information (e.g., measurement object information, TCI state information (spatial relation info)) using the transceiver 106/206, and control to store a channel/signal/Data/information, etc. to be transmitted or received in the memory 104/204.

In addition, in the operation of the Network/UE of FIG. 17, the above-described proposed method (e.g., Proposal #1/Embodiment #A1/A #1-1/#A1-2/#A1-3/Embodiment #A2/Embodiment #A3/Embodiment #A4/A #4-1/#A4-2/ Proposal #2/Embodiment #B1/#B2/#B3, etc.) may be referenced/used.

In the following description, the Network may be one base station including a plurality of TRPs, and may be one cell including a plurality of TRPs. For example, an ideal/ non-ideal) backhaul may be configured between TRP 1 and TRP 2 constituting the network. In addition, the following description is described based on a plurality of TRPs, but this may be equally extended and applied to transmission through a plurality of panels/cells.

In addition, as described above, "TRP" is a panel, an antenna array, a cell (e.g., macro cell/small cell)/pico cell, etc.), transmission point (TP), base station (base station, gNB, etc.) may be replaced and applied. As described above, the TRP may be classified according to information (e.g., index, ID) on the CORESET group (or CORESET pool). As an example, when one terminal is configured to perform transmission/reception with a plurality of TRPs (or cells), this may mean that a plurality of CORESET groups (or CORESET pools) are configured for one terminal. The configuration of such a CORESET group (or CORESET pool) may be performed through higher layer signaling (e.g., RRC signaling, etc.). In addition, the base station may mean a generic term for an object that performs transmission and reception data with the terminal. For example, the base station may be a concept including one or more TPs, one or more TRPs, and the like. In addition, the TP and/or TRP may include a panel of the base station, a transmission and reception unit, and the like.

The UE may receive configuration information from the network (S1701). The configuration information may include system information (SI) and/or scheduling information and/or beam management (BM) related configuration information (e.g., CSI-ResourceConfig IE/NZP CSI-RS resource set IE, etc.) and/or CSI-related configuration information (e.g., CSI-IM resource related information/CSI measurement configuration related information/CSI resource configuration related information/CSI-RS resource related information/CSI report configuration related information, etc.).

For example, the configuration information may include information related to network configuration (i.e., TRP configuration), resource allocation related to multiple TRP-based transmission and reception, and the like. For example, the configuration information may include the configuration for CORESET/CORESET group/the search space (SS) configuration, etc., the configuration for CORESET may include QCL RS/TCI state related information, and the SS configuration including CORESET configuration may include additional QCL RS/TCI State related information. For example, a candidate TCI state combination that may be composed of a plurality of TCI states may be configured based on the configuration information. In addition, the configuration information may include information on TCI state combination.

For example, as described in the above proposed method (e.g., Proposal #1/Embodiment #A1/A #1-1/#A1-2/#A1-3/ Embodiment #A2/Embodiment #A3/Embodiment #A4/A #4-1/#A4-2/Proposal #2/Embodiment #B1/#B2/#B3, etc.), the configuration information may include information related to configuring a resource (e.g., SSB/CSI-RS for mobility, etc.) as a reference RS. For example, in order to configure SSB information/mobility CSI-RS information of a non-serving cell, measurement object (MO) information (e.g., MO ID)/PCI (Physical Cell ID)/SSB or CSI-RS index, or the like may be configured based on the configuration information. For example, in order to configure SSB information/mobility CSI-RS information of a non-serving cell, serving cell information (e.g., serving cell index)/Physical Cell ID (PCI)/SSB or CSI-RS index, or the like may be configured based on configuration information. For example, in order to configure SSB information of a non-serving cell, time/frequency resource information/Physical Cell ID (PCI)/SSB index/SSB power of the non-serving cell SSB may be configured based on the configuration information. For example, when the CSI-RS for mobility of a non-serving cell is configured as a reference RS in QCL information within a serving cell, the changed CSI-RS pattern may be configured/indicated in the time/frequency resource domain based the methods described in the above-described embodiment #A4-1 (e.g., option 2 (option 2-1/2-2)/option 1).

For example, the configuration information may include measurement object information for RRM measurement. Measurement object information may include a list of a plurality of cells and time and frequency domain resource information for each of a plurality of signals associated with the plurality of cells.

In addition, the configuration information may include transmission configuration indicator (TCI) state information of a downlink signal and/or spatial relation info of an uplink signal. The TCI state information may include QCL information for configuring a quasi co-location (QCL) relation between the downlink signal and a reference signal. In addition, the spatial relation info may include information for configuring a spatial relation between the uplink signal and the reference signal.

As a specific example, measurement object information for RRM measurement by the QCL information/spatial relation info, a non-serving cell other than the serving cell of the terminal, and a signal of the non-serving cell may be configured/specified. Based on this, the reference signal for the downlink signal/uplink signal may be configured. Here, the signal of the non-serving cell may include SSB or mobility CSI-RS. As described above, the measurement object information may include a list of a plurality of cells and time and frequency domain resource information for each of a plurality of signals associated with the plurality of cells. Here, the non-serving cell may be configured/specified within a list of the plurality of cells included in the measurement target information. And, the signal of the non-serving cell may be configured/specified as a signal related to the non-serving cell among the plurality of signals.

In addition, the configuration information may include configuration information on a serving cell of the terminal. And, the serving cell of the terminal may be specified by the QCL information/spatial relation info, and the measurement object information may correspond to information associated with the specified serving cell of the terminal. Here, it may also be assumed that the time and frequency resources of the signal of the non-serving cell configured by the QCL information/spatial relationship information are the same as the signal of the specified serving cell of the terminal.

In addition, the configuration information may include configuration information on average energy per resource element (EPRE) of a signal of the non-serving cell configured by the QCL information/spatial relation info. In this case, transmission power of a downlink/uplink signal may be determined based on an EPRE for a signal of the non-serving cell. Here, the EPRE for the signal of the non-serving cell may be configured as an offset value based on the EPRE for the signal of the serving cell of the terminal. In addition, the resource of the serving cell of the terminal may be punctured or rate matched for the time and frequency resource domains in which the signal of the non-serving cell is transmitted.

Also, for example, when the signal of the non-serving cell is the mobility CSI-RS, it is assumed that a frequency domain density of the mobility CSI-RS is 3 or more. When the signal of the non-serving cell is the mobility CSI-RS, based on the location of a resource element in which the mobility CSI-RS is transmitted, it is assumed that the mobility CSI-RS is repeated in units of the specific number of resource elements within a same resource block. When the signal of the non-serving cell is the mobility CSI-RS, based on the location of a symbol in which the mobility CSI-RS is transmitted, it is assumed that the mobility CSI-RS is repeated in units of the specific number of symbols within a same slot. When the signal of the non-serving cell is the mobility CSI-RS, based on the location of a symbol in which the mobility CSI-RS is transmitted, it is assumed that the mobility CSI-RS is repeated on a same location of a symbol within consecutive slots.

For example, as described in the above proposed method (e.g., Proposal #1/Embodiment #A1/A #1-1/#A1-2/#A1-3/ Embodiment #A2/Embodiment #A3/Embodiment #A4/A #4-1/#A4-2/Proposal #2/Embodiment #B1/#B2/#B3, etc.), resources for CSI measurement/acquisition/reporting in a serving cell may be configured based on the resource of the non-serving cell (e.g., SSB/CSI-RS for mobility, etc.), and the configuration information may include a configuration for this (e.g., CSI-ResourceConfig/CSI-SSB-ResourceSet/Mobility-CSI-RS-ResourceSet, etc.) and the like. For example, the configuration information may include TRS configuration information based on the mobility CSI-RS of the serving cell/non-serving cell (e.g., TRS configuration related offset information, etc.)/power related information for mobility CSI-RS of non-serving cell/serving cell and the like.

In addition, the configuration information may be transmitted through higher layer signaling (e.g., RRC signaling or MAC CE). In addition, when the configuration information is defined or configured in advance, the corresponding step may be omitted.

The UE may receive control information from the network (S1702). The control information may be received through a control channel (e.g., PDCCH). As an example, the control information may be DCI. For example, the control information described in the above proposed method (e.g., Proposal #1/Embodiment #A1/A #1-1/#A1-2/#A1-3/Embodiment #A2/Embodiment #A3/Embodiment #A4/A #4-1/#A4-2/Proposal #2/Embodiment #B1/#B2/#B3, etc.) may be configured. For example, the control information may include information on TCI state(s) and/or QCL RS(s) and/or DMRS port(s). For example, a plurality of (different) TCI states may be indicated/configured in the TCI state field within the control information (e.g., DCI). In addition, when the control information is defined or configured in advance, the corresponding step may be omitted. For example, some configuration/information configured based on the configuration information of step S1701 described above may be configured based on control information.

For example, the control information may be transmitted through a PDCCH, and QCL assumption may be applied based on the TCI state information configured in step S1701 for reception of the PDCCH. In this case, the order in which the step of receiving the PDCCH (S1702) and the step of receiving the reference signal having a QCL relationship with the PDCCH (i.e., DMRS of the PDCCH) (S1703) may be changed.

The UE may receive a reference signal from the network (S1703).

Here, the reference signal may be received based on configuration information/control information configured/indicated in step S1701 and/or step S1702. For example, the reference signal may correspond to SSB/mobility CSI-RS of a non-serving cell (i.e., a neighbor cell).

For example, as described in the above proposed method (e.g., Proposal #1/Embodiment #A1/A #1-1/#A1-2/#A1-3/Embodiment #A2/Embodiment #A3/Embodiment #A4/A #4-1/#A4-2/Proposal #2/Embodiment #B1/#B2/#B3, etc.), signals/resources (SSB/mobility CSI-RS, etc.) of non-serving cells may be configured with a downlink signal within serving cell (e.g., reference signal for PDCCH, PDSCH, CSI measurement/acquisition/report) and/or reference signals/resources related to uplink signals (e.g., PUSCH, PUCCH, SRS).

The network may transmit a downlink signal to the UE or may receive an uplink signal from the UE (S1704).

Here, the UE may receive a downlink signal based on the configuration information of step S1701 described above. In particular, a downlink signal may be received by applying a QCL assumption based on TCI state information of the downlink signal.

In addition, the UE may transmit an uplink signal based on the configuration information of step S1701 described above. In particular, the uplink signal may be transmitted by applying a QCL assumption based on the spatial relation info of the uplink signal.

For example, when the downlink signal is the PDSCH or the uplink signal is the PUSCH, it may be transmitted based on the scheduling information of the control information received in step S1702.

If the downlink signal is CSI-RS, based on this, the UE may measure the CSI and report the CSI to the network. For example, the UE may perform L1 measurement (e.g., L1-RSRP/L1-SINR/etc.) and report the measurement results to the network.

Figure 18:
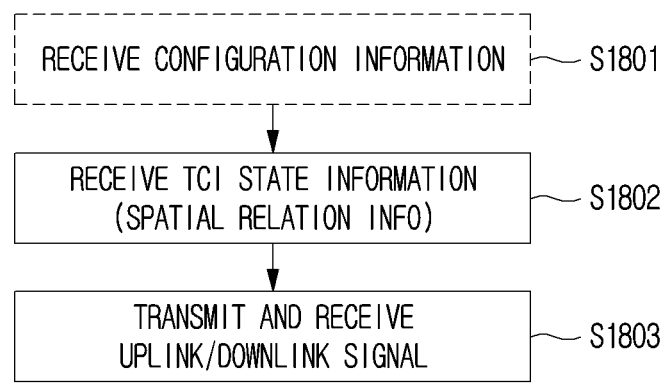
FIG. 18 is a diagram illustrating an operation of a terminal for transmitting and receiving an uplink/downlink signal according to an embodiment of the present disclosure.

FIG. 18 is a diagram illustrating an operation of a terminal for transmitting and receiving an uplink/downlink signal according to an embodiment of the present disclosure.

FIG. 18 illustrates an operation of the terminal based on the above-described proposed method (e.g., Proposal #1/Embodiment #A1/A #1-1/#A1-2/#A1-3/Embodiment #A2/Embodiment #A3/Embodiment #A4/A #4-1/#A4-2/Proposal #2/Embodiment #B1/#B2/#B3, etc.). The example of FIG. 18 is for convenience of description and does not limit the scope of the present disclosure. Some step(s) illustrated in FIG. 18 may be omitted depending on circumstances and/or configurations. In addition, the terminal in FIG. 18 is only examples, and may be implemented with the device illustrated in FIG. 20 below. For example, the processor 102/202 of FIG. 20 may control to transmit/receive a channel/signal/data/information using the transceiver 106/206, and control to store a channel/signal/Data/information, etc. to be transmitted or received in the memory 104/204.

The terminal may receive configuration information from the base station (S1801).

As described in the above proposed method (e.g., Proposal #1/Embodiment #A1/A #1-1/#A1-2/#A1-3/Embodiment #A2/Embodiment #A3/Embodiment #A4/A #4-1/#A4-2/Proposal #2/Embodiment #B1/#B2/#B3, etc.), the configuration information may include information related to configuring a resource (e.g., SSB/CSI-RS for mobility, etc.) as a reference RS.

For example, the configuration information may include measurement object information for RRM measurement. Measurement object information may include a list of a plurality of cells and time and frequency domain resource information for each of a plurality of signals associated with the plurality of cells.

In addition, the configuration information may include configuration information on a serving cell of the terminal. Here, measurement object information may be set in correspondence with configuration information for each serving cell.

In addition, when the CSI-RS for mobility of a non-serving cell is configured as a reference RS in QCL information within a serving cell, the changed CSI-RS pattern may be configured/indicated in the time/frequency resource domain based the methods described in the above-described embodiment #A4-1 (e.g., option 2 (option 2-1/2-2)/option 1).

In addition, the configuration information may include information on average energy per resource element (EPRE) of a signal of the non-serving cell. Here, the EPRE for the signal of the non-serving cell may be configured as an offset value based on the EPRE for the signal of the serving cell of the terminal.

The terminal receives TCI state information (or spatial relation info) from the base station (S1802).

Here, the TCI state information may include QCL information for configuring a quasi co-location (QCL) relation between the downlink signal and a reference signal (in particular, a signal of a non-serving cell). In addition, the spatial relation info may include information for configuring a spatial relation (i.e., a spatial domain transmission filter) between the uplink signal and the reference signal. Based on this, a reference signal for the downlink signal/uplink signal may be configured with a signal of a non-serving cell.

Here, the signal of the non-serving cell may include SSB or mobility CSI-RS.

For example, in order to configure SSB information/ mobility CSI-RS information of a non-serving cell, measurement object (MO) information (e.g., MO ID)/Physical Cell ID (PCI)/SSB or CSI-RS index or the like may be configured based on the TCI state information (or spatial relation info). For example, in order to configure SSB information/mobility CSI-RS information of a non-serving cell, serving cell information (e.g., serving cell index)/ Physical Cell ID (PCI)/SSB or CSI-RS index or the like may be configured based on TCI state information (or spatial relation info). For example, in order to configure SSB information of a non-serving cell, time/frequency resource information/Physical Cell ID (PCI)/SSB index/SSB power of non-serving cell SSB may be configured based on the TCI state information (or spatial relation info).

As described above, the measurement object information may include a list of a plurality of cells and time and frequency domain resource information for each of a plurality of signals associated with the plurality of cells. Here, the non-serving cell may be configured/specified within a list of the plurality of cells included in the measurement object information. And, the signal of the non-serving cell may be configured/specified as a signal related to the non-serving cell among the plurality of signals.

In addition, a serving cell of the terminal may be specified by the QCL information/spatial relation info, and the measurement object information may correspond to information associated with the specified serving cell of the terminal. Here, it may also be assumed that the time and frequency resources of the signal of the non-serving cell configured by the QCL information/spatial relation info are the same as the signal of the specified serving cell of the terminal.

Here, resources of the serving cell of the terminal may be punctured or rate matched for time and frequency resource domains in which signals of the non-serving cell are transmitted.

The terminal may receive the downlink signal from the base station based on the TCI state information, or may transmit the uplink signal to the base station based on the spatial relation info (S1803).

That is, the terminal may receive the downlink signal from the base station by applying a QCL assumption configured by TCI state information. Alternatively, the terminal may transmit an uplink signal to the base station by applying a spatial domain transmission filter configured by spatial relation info.

Here, the downlink signal may include at least one of a channel state information-reference signal (CSI-RS), a physical downlink control channel (PDCCH), and/or a physical downlink shared channel (PDSCH). And, the uplink signal may include at least one of a sounding reference signal (SRS), a physical uplink control channel (PUCCH), and a physical uplink shared channel (PUSCH).

Also, for example, when the signal of the non-serving cell is the mobility CSI-RS, it is assumed that a frequency domain density of the mobility CSI-RS is 3 or more. When the signal of the non-serving cell is the mobility CSI-RS, based on the location of a resource element in which the mobility CSI-RS is transmitted, it is assumed that the mobility CSI-RS is repeated in units of the specific number of resource elements within a same resource block. When the signal of the non-serving cell is the mobility CSI-RS, based on the location of a symbol in which the mobility CSI-RS is transmitted, it is assumed that the mobility CSI-RS is repeated in units of the specific number of symbols within a same slot. When the signal of the non-serving cell is the mobility CSI-RS, based on the location of a symbol in which the mobility CSI-RS is transmitted, it is assumed that the mobility CSI-RS is repeated on a same location of a symbol within consecutive slots.

In addition, power for the downlink signal and/or the uplink signal may be determined based on an EPRE for a signal of the non-serving cell.

Figure 19:
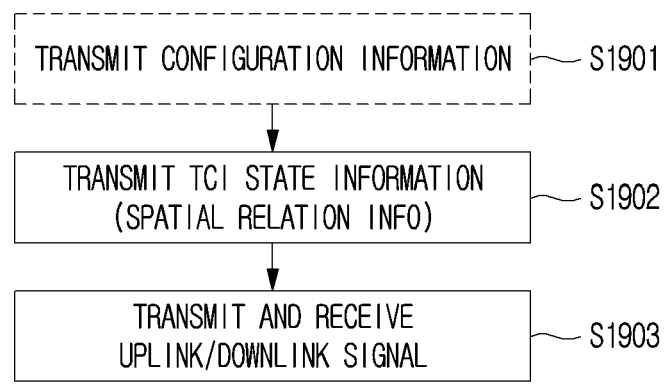
FIG. 19 is a diagram illustrating an operation of a base station for transmitting and receiving an uplink/downlink signal according to an embodiment of the present disclosure.

FIG. 19 is a diagram illustrating an operation of a base station for transmitting and receiving an uplink/downlink signal according to an embodiment of the present disclosure.

FIG. 19 illustrates an operation of the base station based on the above-described proposed method (e.g., Proposal #1/Embodiment #A1/A #1-1/#A1-2/#A1-3/Embodiment #A2/Embodiment #A3/Embodiment #A4/A #4-1/#A4-2/ Proposal #2/Embodiment #B1/#B2/#B3, etc.). The example of FIG. 19 is for convenience of description and does not limit the scope of the present disclosure. Some step(s) illustrated in FIG. 19 may be omitted depending on circumstances and/or configurations. In addition, the base station in FIG. 19 is only examples, and may be implemented with the device illustrated in FIG. 20 below. For example, the processor 102/202 of FIG. 20 may control to transmit/receive a channel/signal/data/information using the transceiver 106/ 206, and control to store a channel/signal/Data/information, etc. to be transmitted or received in the memory 104/204.

The base station may transmit configuration information to the terminal (S1901).

As described in the above proposed method (e.g., Proposal #1/Embodiment #A1/A #1-1/#A1-2/#A1-3/Embodiment #A2/Embodiment #A3/Embodiment #A4/A #4-1/#A4- 2/Proposal #2/Embodiment #B1/#B2/#B3, etc.), the configuration information may include information related to configuring a resource (e.g., SSB/CSI-RS for mobility, etc.) as a reference RS.

For example, the configuration information may include measurement object information for RRM measurement. Measurement object information may include a list of a plurality of cells and time and frequency domain resource information for each of a plurality of signals associated with the plurality of cells.

In addition, the configuration information may include configuration information on a serving cell of the terminal. Here, measurement object information may be set in correspondence with configuration information for each serving cell.

In addition, when the CSI-RS for mobility of a non-serving cell is configured as a reference RS in QCL information within a serving cell, the changed CSI-RS pattern may be configured/indicated in the time/frequency resource domain based the methods described in the above-described embodiment #A4-1 (e.g., option 2 (option 2-1/2-2)/option 1).

In addition, the configuration information may include information on average energy per resource element (EPRE) of a signal of the non-serving cell. Here, the EPRE for the signal of the non-serving cell may be configured as an offset value based on the EPRE for the signal of the serving cell of the terminal.

The base station transmits TCI state information (or spatial relation info) to the terminal (S1902).

Here, the TCI state information may include QCL information for configuring a quasi co-location (QCL) relation between the downlink signal and a reference signal (in particular, a signal of a non-serving cell). In addition, the spatial relation info may include information for configuring a spatial relation (i.e., a spatial domain transmission filter) between the uplink signal and the reference signal. Based on this, a reference signal for the downlink signal/uplink signal may be configured with a signal of a non-serving cell.

Here, the signal of the non-serving cell may include SSB or mobility CSI-RS.

For example, in order to configure SSB information/mobility CSI-RS information of a non-serving cell, measurement object (MO) information (e.g., MO ID)/Physical Cell ID (PCI)/SSB or CSI-RS index or the like may be configured based on the TCI state information (or spatial relation info). For example, in order to configure SSB information/mobility CSI-RS information of a non-serving cell, serving cell information (e.g., serving cell index)/Physical Cell ID (PCI)/SSB or CSI-RS index or the like may be configured based on TCI state information (or spatial relation info). For example, in order to configure SSB information of a non-serving cell, time/frequency resource information/Physical Cell ID (PCI)/SSB index/SSB power of non-serving cell SSB may be configured based on the TCI state information (or spatial relation info).

As described above, the measurement object information may include a list of a plurality of cells and time and frequency domain resource information for each of a plurality of signals associated with the plurality of cells. Here, the non-serving cell may be configured/specified within a list of the plurality of cells included in the measurement object information. And, the signal of the non-serving cell may be configured/specified as a signal related to the non-serving cell among the plurality of signals.

In addition, a serving cell of the terminal may be specified by the QCL information/spatial relation info, and the measurement object information may correspond to information associated with the specified serving cell of the terminal. Here, it may also be assumed that the time and frequency resources of the signal of the non-serving cell configured by the QCL information/spatial relation info are the same as the signal of the specified serving cell of the terminal.

Here, resources of the serving cell of the terminal may be punctured or rate matched for time and frequency resource domains in which signals of the non-serving cell are transmitted.

The base station may transmit the downlink signal to the terminal based on the TCI state information, or may receive the uplink signal from the terminal based on the spatial relation info (S1903).

Here, the downlink signal may include at least one of a channel state information-reference signal (CSI-RS), a physical downlink control channel (PDCCH), and/or a physical downlink shared channel (PDSCH). And, the uplink signal may include at least one of a sounding reference signal (SRS), a physical uplink control channel (PUCCH), and a physical uplink shared channel (PUSCH).

Also, for example, when the signal of the non-serving cell is the mobility CSI-RS, it is assumed that a frequency domain density of the mobility CSI-RS is 3 or more. When the signal of the non-serving cell is the mobility CSI-RS, based on the location of a resource element in which the mobility CSI-RS is transmitted, it is assumed that the mobility CSI-RS is repeated in units of the specific number of resource elements within a same resource block. When the signal of the non-serving cell is the mobility CSI-RS, based on the location of a symbol in which the mobility CSI-RS is transmitted, it is assumed that the mobility CSI-RS is repeated in units of the specific number of symbols within a same slot. When the signal of the non-serving cell is the mobility CSI-RS, based on the location of a symbol in which the mobility CSI-RS is transmitted, it is assumed that the mobility CSI-RS is repeated on a same location of a symbol within consecutive slots.

In addition, power for the downlink signal and/or the uplink signal may be determined based on an EPRE for a signal of the non-serving cell.

General Device to which the Present Disclosure May be Applied

Figure 20:
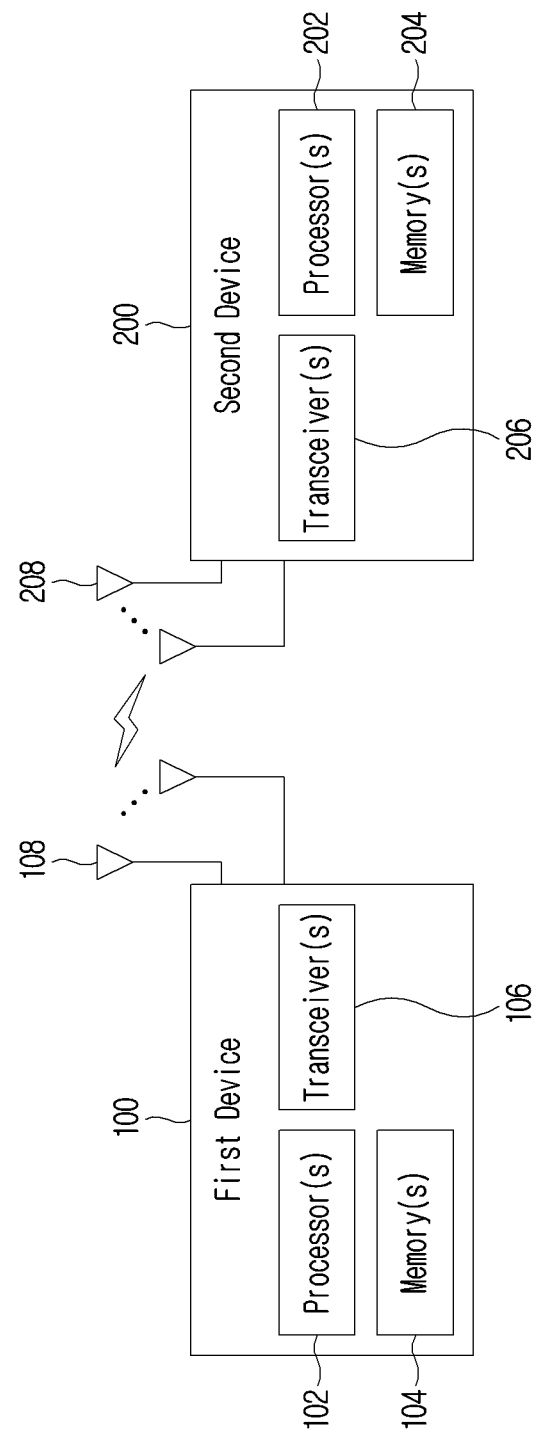
FIG. 20 illustrates a block diagram of a wireless communication device according to an embodiment of the present disclosure.

FIG. 20 illustrates a block diagram of a wireless communication device according to an embodiment of the present disclosure.

In reference to FIG. 20, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts disclosed in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device XXX, YYY of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device XXX, YYY of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:
   receiving configuration information for spatial information for a downlink signal; and
   receiving the downlink signal in a serving cell based on the spatial information,
   wherein the configuration information includes information for a resource of a reference signal for the spatial information, and
   wherein the reference signal includes a specific signal of a non-serving cell.

2. The method of claim 1,
   wherein the reference signal is configured based on at least one of information for a measurement object, configuration information related to the serving cell, or information for the specific signal of the non-serving cell.

3. The method of claim 2,
   wherein the serving cell is specified by the spatial information, and
   wherein the information for the measurement object is associated with the serving cell.

4. The method of claim 3,
   wherein a time and frequency resource of the specific signal of the non-serving cell is assumed that it is identical to a signal of the serving cell.

5. The method of claim 2,
   wherein the non-serving cell is configured in a list of a plurality of cells included in the information for the measurement object.

6. The method of claim 5,
   wherein the specific signal of the non-serving cell is configured to a signal related to the non-serving cell among a plurality of signals associated with the plurality of cells.

7. The method of claim 1, further comprising:
   receiving configuration information on energy per resource element (EPRE) for the specific signal of the non-serving cell.

8. The method of claim 7,
   wherein a power for the downlink signal is determined based on the EPRE for the specific signal of the non-serving cell.

9. The method of claim 7,
   wherein the EPRE for the specific signal of the non-serving cell is configured with an offset value for EPRE for a signal of the serving cell.

10. The method of claim 1,
    wherein a resource of the serving cell is punctured or rate matched for a time and frequency resource region in which the specific signal of the non-serving cell is transmitted.

11. The method of claim 1,
wherein the specific signal of the non-serving cell is synchronization signal/physical broadcast channel block (SSB) or mobility channel state information-reference signal (CSI-RS).

12. The method of claim 11,
wherein, based on the specific signal of the non-serving cell being the mobility CSI-RS, it is assumed that a frequency domain density of the mobility CSI-RS is 3 or more.

13. The method of claim 11,
wherein, based on the specific signal of the non-serving cell being the mobility CSI-RS and a location of a resource element in which the mobility CSI-RS is transmitted, it is assumed that the mobility CSI-RS is repeated in units of a specific number of resource elements within a same resource block.

14. The method of claim 11,
wherein, based on the specific signal of the non-serving cell being the mobility CSI-RS and a location of a symbol in which the mobility CSI-RS is transmitted, it is assumed that the mobility CSI-RS is repeated in units of a specific number of symbols within a same slot.

15. The method of claim 11,
wherein, based on the specific signal of the non-serving cell being the mobility CSI-RS and a location of a symbol in which the mobility CSI-RS is transmitted, it is assumed that the mobility CSI-RS is repeated on a same location of a symbol within consecutive slots.

16. The method of claim 1,
wherein the downlink signal includes at least one of a channel state information-reference signal (CSI-RS), a physical downlink control channel (PDCCH), and/or a physical downlink shared channel (PDSCH).

17. An apparatus comprising:
at least one transceiver for transmitting and receiving a wireless signal; and
at least one processor for controlling the at least one transceiver,
wherein the at least one processor configured to:
receive configuration information for spatial information for a downlink signal; and
receive the downlink signal based on the spatial information,
wherein the configuration information includes information for a resource of a reference signal for the spatial information, and
wherein the reference signal includes a specific signal of a non-serving cell.

18. An apparatus comprising:
at least one transceiver for transmitting and receiving a wireless signal; and
at least one processor for controlling the at least one transceiver,
wherein the at least one processor configured to:
transmit configuration information for spatial information for a downlink signal; and
transmit the downlink signal based on the spatial information,
wherein the configuration information includes information for a resource of a reference signal for the spatial information, and
wherein the reference signal includes a specific signal of a non-serving cell.

* * * * *